US011951376B2

(12) United States Patent
Aksamit et al.

(10) Patent No.: US 11,951,376 B2
(45) Date of Patent: Apr. 9, 2024

(54) MIXED REALITY SIMULATION AND TRAINING SYSTEM

(71) Applicant: CRUSH AR LLC, Mesa, AZ (US)

(72) Inventors: David G. Aksamit, Phoenix, AZ (US); Kenneth E. Irwin, Jr., Dawsonville, GA (US); Eric M. Pilnock, Mesa, AZ (US)

(73) Assignee: CRUSH AR LLC, Mesa, AZ (US)

( * ) Notice: Subject to any disclaimer, the term of this patent is extended or adjusted under 35 U.S.C. 154(b) by 0 days.

(21) Appl. No.: 18/144,559

(22) Filed: May 8, 2023

(65) Prior Publication Data

US 2023/0398427 A1 Dec. 14, 2023

Related U.S. Application Data

(60) Provisional application No. 63/576,311, filed on Jan. 30, 2023, provisional application No. 63/474,774, filed on Sep. 13, 2022, provisional application No. 63/350,944, filed on Jun. 10, 2022.

(51) Int. Cl.
*A63B 71/06* (2006.01)
*A63B 24/00* (2006.01)
*A63B 69/36* (2006.01)

(52) U.S. Cl.
CPC ...... *A63B 71/0622* (2013.01); *A63B 24/0006* (2013.01); *A63B 24/0084* (2013.01); *A63B 69/3632* (2013.01); *A63B 2024/0015* (2013.01); *A63B 2071/0638* (2013.01); *A63B 2071/0666* (2013.01); *A63B 2071/068* (2013.01); *A63B 2220/803* (2013.01); *A63B 2220/833* (2013.01); *A63B 2230/00* (2013.01)

(58) Field of Classification Search
CPC ............ A63B 71/0622; A63B 24/0006; A63B 24/0084; A63B 69/3632; A63B 2024/0015; A63B 2071/0638; A63B 2071/0666; A63B 2071/068; A63B 2220/803; A63B 2220/833; A63B 2230/00
See application file for complete search history.

(56) References Cited

U.S. PATENT DOCUMENTS 7,854,669 B2   12/2010   Marty et al.
9,764,213 B2    9/2017   Nicora
10,646,767 B2   5/2020   Kudirka et al.
(Continued)

OTHER PUBLICATIONS

Invitation to Pay Additional Fees and, Where Applicable, Protest Fee dated Jul. 13, 2023 in PCT Application No. PCT/US2023/023085.

(Continued)

*Primary Examiner* — Jeffrey S Vanderveen
(74) *Attorney, Agent, or Firm* — Panitch Schwarze Belisario & Nadel LLP

(57) ABSTRACT

A system, method, and device are disclosed for creating a simulation that seamlessly switches or dissolves between see through Augmented Reality (AR) and Virtual Reality (VR) thereby creating a mixed reality environment. The mixed reality environment switching or dissolving between AR and VR (or vice-versa) automatically based on predefined rules. The system, method, and device enabling the use of existing real world devices (e.g., sports equipment) displaying the real world devices in both AR and VR modes.

14 Claims, 29 Drawing Sheets

(56) References Cited

U.S. PATENT DOCUMENTS

| | | |
|---|---|---|
| 10,748,443 B2 | 8/2020 | Koniki et al. |
| 11,135,396 B2 | 10/2021 | Tran et al. |
| 2013/0208948 A1 | 8/2013 | Berkovich et al. |
| 2020/0020165 A1 | 1/2020 | Tran et al. |
| 2020/0193553 A1 | 6/2020 | Rhoads et al. |
| 2021/0213330 A1 | 7/2021 | Bentley et al. |
| 2021/0366312 A1 | 11/2021 | Buras et al. |
| 2022/0072379 A1* | 3/2022 | Putnam .............. A63B 24/0006 |

OTHER PUBLICATIONS

International Search Report and Written Opinion dated Sep. 29, 2023 in Application No. PCT/US23/23085.

\* cited by examiner

MIXED REALITY SIMULATION AND TRAINING SYSTEM

CROSS-REFERENCE TO RELATED APPLICATIONS

This application claims priority to U.S. Provisional Patent Application Nos. 63/350,944 filed Jun. 10, 2022; 63/474,774 filed Sep. 13, 2022; and 63/576,311 filed Jan. 30, 2023, each of which are incorporated by reference herein.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

FIELD OF THE INVENTION

The present invention relates to a system, method, and device for enabling synchronized simulation and/or training in both Augmented Reality (AR) and Virtual Reality (VR). Specifically, the inherent aspects of this invention enable training and play in a mixed reality (i.e., both AR and VR) environment, preferably using existing standard real world objects. While the systems and methods disclosed with the present invention could be of utility to any type of sport or game, the benefits are particularly significant for golf training and simulation.

BACKGROUND OF THE INVENTION

The Virtual Reality (VR) industry started by providing devices for medical, flight simulation, automobile industry design, and military training purposes circa 1970. The 1990s saw the first widespread commercial releases of consumer headsets—e.g., in 1991, Sega announced the Sega VR headset for arcade games and the Mega Drive console. By 2016 there were at least 230 companies developing VR related products. Meta currently has around 400 employees focused on VR development; Google, Apple, Amazon, Microsoft, Sony, and Samsung all have dedicated VR and Augmented Reality (AR) groups.

The first commercial AR experiences were largely in the entertainment and gaming businesses, but now other industries are also developing AR applications—e.g., knowledge sharing, educating, managing information, organizing distant meetings, telemedicine. One of the first known uses of augmented reality (utilizing Google glasses) leveraged GPS (Global Positioning System) to enable user guidance via a path traced in AR to allow people to navigate unknown environments.

Recently, various AR and VR based sports training aides have been developed in an attempt to enhance the sports training process by utilizing the unique aspects of AR and/or VR. For example, the company DribbleUp is selling application enabled soccer, medicine, and basket balls with AR markers printed on the surfaces of the balls that enable smart phones to track each ball's motion, thereby allowing the user to practice a plurality of drills with the AR marked ball while having the AR application tracking the movement and providing real time visual feedback as well as an assessment of the user's abilities. However, the DribbleUp system tracks the ball motion by a smart phone's camera (typically mounted on a tripod) and displays its real time operational metrics on a separate screen, thereby requiring the user's eyes to sequence between the ball and the display screen and not necessarily concentrate on the "play" action itself. Thus, the augmented reality in this embodiment is less immersive and consequently less suitable for training with sports where focus is essential—e.g., baseball, tennis, golf.

"Phigolf" and "SwingLogic SLX MicroSim" both offer exemplary prior art golf simulations where a "Swing Stick" permits the system to track a user's golf swing thereby supporting the creation of simulated golf drives on virtual golf courses that are displayed on a separate monitor. Rather than employing a "Swing Stick", the golf simulator "Optishot" uses infrared sensors in a floor pad to track standard golf club motion to also enable the creation of simulated golf drives on virtual golf courses that are displayed on a separate monitor. All three of these systems have the benefit of allowing the user to focus his or her eyes on the golf tee area with the simulated golf trajectory provided only after the swing is complete. Thus, while these exemplary systems have the advantage of allowing the user to focus on an object of interest (i.e., a golf ball or tee) they have the disadvantage of not providing any augmented reality feedback to the user while he or she is swinging the golf club. Additionally, the accuracy of the simulated trajectory of the golf ball in these exemplary systems tends to be marginal with the systems lacking fine swing analytics.

The "FlightScope Mevo" and "Rapsodo" exemplary prior art golf play monitoring systems overcome many accuracy problems by tracking golf swings and hit balls in the real world at a driving range or on a golf course. However, the user receives no feedback while he or she is setting up and executing the shot and can only review the metrics or analytics of a particular shot after it was executed, thereby limiting the training experience and offering no simulation capabilities whatsoever. Finally, the "Trackman" and "Gimme Simulator" prior art exemplary systems are substantially more expensive than the previously sited prior art and provide accurate simulation 100 (FIG. 1A) on a large screen 101 with an optional second screen 102 for detailed analytics of the previous shot. Again, with these exemplary prior art systems as before the user receives no feedback while he or she is setting up and executing the shot and can only review the metrics of a particular shot after it was executed thereby limiting the training experience.

Some efforts to utilize AR and/or VR in simulation and training environments in general have been attempted, most notably U.S. Pat. No. 10,748,443 (Koniki et al.) and 11,135, 396 (Tran et al.) as well as and U.S. Patent Application Publication No. 2021/0366312 (Buras et al.) However, Koniki et al. primarily discloses techniques for mirroring a plurality of users' virtual spaces and actions in an AR or VR environment so that a student can observer a trainer's actions in the student's own environment. Thus, while Koniki et al. enables AR or VR enhanced remote training, it is silent on the vexing problems of accurately collecting analytics from rapidly changing real world events (e.g., tennis or golf swing), as well as providing feedback to a user while he or she is performing a task.

The disclosure of Tran et al. provides a VR device that can " . . . selectably turn on or off (a) view of an outside environment in front of the person's eye; a processor coupled to the camera and to the glass to selectably switch between augmented reality and virtual reality . . . " (Abstract) thereby enabling both instruction and simulation. However, Tran et al. is also silent concerning collecting analytics from rapidly changing real world events as well as providing analytics feedback to a user while he or she is performing a task. Additionally, the switching from augmented to virtual reality is primarily user selectable and therefore a manual process. Finally, the Buras et al. disclosure primarily concerns " . . . providing virtual reality guidance to a user performing a procedure on a virtual instance of an item . . . (that) may be used in training the user to perform the procedure on a physical instance of the item" (Abstract) and again does not garner analytics from rapidly changing real world events or provide associated feedback.

Specific golf and other sports AR and/or VR simulation and training systems have also been attempted, most notably U.S. Pat. No. 7,854,669 (Marty et al.); U.S. Pat. No. 9,764,213 (Nicora); and U.S. Pat. No. 10,646,767 (Kudirka et al.) However, both Marty et al. and Nicora both disclose primarily trajectory analysis that is ultimately displayed in a simulation on a detached screen and therefore does not address issues related to immersive AR and/or VR—e.g., FIG. 1B illustrates FIG. 1 of Marty et al. and FIG. 1C illustrates FIG. 1 of Nicora. Finally, Kudirka et al. does teach "mixed reality" sports simulation with the user employing a Near Eye Display (NED) device " . . . that is at least partially transparent to overlay (superimpose) computer-generated (virtual) images on at least a portion of the user's field of view of the real world . . . " (column 2, lines 20 thru 24) thereby allowing the user to interact with standard sports equipment in AR and (optionally) VR environments. Real world analytics used to determine the virtual ball's flight path are derived primarily by monitoring the actual real world golf ball's path a short distance after it has been hit before it is typically captured by a net—e.g., FIG. 1D is a reproduction of FIG. 7 of Kudirka et al. However, since Kudirka et al. employs an actual real world golf ball's initial trajectory to calculate the simulated ball's path and final position on the virtual course the disclosed invention is typically not portable with a relatively large physical space required to accommodate the golf tee, tracking devices, and capture net. Additionally, the AR and (optionally) VR "NED device" glasses disclosed in Kudirka et al. do not employ stereoscopic video passthrough technology which enables a much larger field when viewing anchored and three-dimensional (3D) virtual objects, then the disclosed "NED device."

It is therefore highly desirable to develop systems, techniques, and methodologies for providing simulation and/or training in both AR and VR where rapidly changing real world analytics drive the virtual simulation and/or training process. Ideally, these mechanisms would also be portable while supporting an immersive stereoscopic experience while using interactions with standard sports equipment. The present invention essentially eliminates or solves the problems associated with simulation and/or training in mixed reality environments.

SUMMARY OF THE INVENTION

A general aspect of the present invention relates to providing immersive mixed reality simulations with real time coordination of both AR and VR environments. These mixed reality simulations typically involving sports or gaming where the user can see and interact with real world objects (e.g., golf clubs, tennis rackets, baseball bats, dice, Jenga® blocks) with AR overlay enhancements that both assist the user with real time interaction and can optionally provide historical feedback of the user's and object's previous motions, orientation, paths, velocity, etc. At a certain point in the simulation, the real world AR enhanced view transitions (i.e., switches or dissolves) into a completely immersive VR rendering of the simulation or vice versa. With this general aspect of the invention an automated process analyzes the user's motions to both provide feedback in AR and VR as well as control various aspects of the simulation. This automated process typically also controlling the change from an AR to a VR mode (or vice versa) while conforming to established rules and guidelines.

In an optional preferred specific embodiment of this general aspect, stereoscopic video passthrough AR/VR goggles are employed as the primary visual input for the user, thereby ensuring a larger Field Of View (FOV) much greater than prior art see-through AR glasses. The stereoscopic video passthrough AR/VR goggles, in conjunction with associated applications and sensors automatically generating visual simulations and augmentations based on user interactions, motions, and actions associated with real world devices that the user interacts with during the simulation and/or training session. For example, in a golf simulation embodiment, the user may swing a real world golf club attempting to hit a virtual golf ball with the velocity, angle of attack, rotation, arc, type of golf club, and acceleration of the golf club determining the inputs to the simulated trajectory of the virtual golf ball "hit" by the real world physical club.

In one specific preferred embodiment, the stereoscopic video passthrough AR/VR goggles are configured with six degrees of freedom (6 DoF) tracking, high resolution screens, and passthrough capabilities to provide a level of simulation feedback for the user that is hitherto unknown. With this preferred specific embodiment, the user experiences both stereoscopic visual and auditory guidance using VR/AR objects in both static and animated simulations. The 6 DoF AR/VR goggles providing the ability to anchor virtual objects (e.g., virtual golf ball) with respect to the real world while in AR operational mode. The use of stereoscopic video passthrough is also significant, since video passthrough allows for a much larger field of view compared to prior art stereoscopic see-through AR. For example, a standard size notebook an arm's length away from the user's eyes is approximately the same size of the window that is limited when viewing anchored and 3D virtual objects with prior art see-through AR glasses. Thus, the combination of 6 DoF and stereoscopic video passthrough AR/VR goggles enables both the anchoring of virtual objects with respect to the real world as well as rendering of the virtual objects stereoscopically, effectively synchronizing the virtual and real worlds into a common homogeneous mixed reality environment.

In another preferred embodiment, existing standard sports equipment is seamlessly integrated into the AR/VR simulation with an added clip-on device that measures acceleration, angle of incidence, arc of swing, timing of swing, etc. This added clip-on device effectively enabling the use of real world sporting equipment to be the primary interaction device with the simulated environment.

In a specific embodiment, real world objects and portions of the user's body (e.g., hands) that are visible when operating in AR view or mode are simultaneously modeled in the virtual environment with any movement of the modeled objects being mimicked with their associated virtual model embodiments. This specific embodiment has the advantage of enabling seamless transitions from AR to VR modes or views with minimal disorientation experienced by the user.

In another embodiment, the user's biometric data is garnered in addition to the motion metrics of real world sporting equipment. With this embodiment, a plurality of user biometric data (e.g., heart rate, eye motion, footing force plate pressure and torque sensing, brain activity, real time full body tracking) are garnered and seamlessly integrated into the AR/VR simulation and/or training session. Thus, for a given simulation and/or training session, the garnered user's biometric data can be time tagged and analyzed with respect to the current understanding of biomechanics and mental and physical processes conducive to peak athletic performance. For example, the lead wrist flexion of a golf user swinging a real world driver at a virtual golf ball at a predetermined time period (e.g., 900 ms) after the golf swing begins can be measured and compared with the amount of hip rotation and mass centering of the same user at the time the swing began to assess how well the user transitions and recenters during a golf swing.

In yet another embodiment, varying levels of difficulty can be programmed into the AR/VR simulation to allow users of different abilities to compete against each other. In this embodiment, the simulation's tolerance to user error can be programmed to adjust for the user's skill level. For example, with a golf simulation the professional or highly skilled user may use a pure simulation where the user's real world swing is exactly represented in the virtual environment. However, a less competent user may use a more forgiving simulation where the virtual ball is always struck on the theoretical correct position of the clubface regardless of the actual club placement. Another less competent user may use a simulation where the clubface angle is less important than the club path. Alternatively, the less competent user can be equipped with various "tools" to allow him or her to modify their play or their opponent's play to become more competitive—e.g., the lesser user may be given a limited number of mini "black holes" that they can use whenever they want in a golf round thereby gravitating their hit ball to the hole, or the lesser user can be given one or more "mud balls" that can be used occasionally against their opponent to apply a random sidespin force thereby creating a certain amount of unpredictability to the shot for the more experienced user, or a golf ball that listens to the lesser user such that when the user says "sit" it scrubs 10% off the ball speed.

In still another embodiment, the motions of the user and/or any adjunct equipment used by the user are stored and replayed in either the AR or VR environment. These replays of the user and/or adjunct equipment motions may appear as different strobed images displaying various snapshots of motion through specific time periods (e.g., every 10 ms) or as tracer lines with optional tangent vectors indicating both the motion path as well as its magnitude.

In a second general aspect, a mixed reality simulation environment is comprised of a fade or dissolve mixture of a virtual world and the real world immediate surroundings of the user. With this general aspect the user experiences a mixture of a virtual world combined with the user's immediate surroundings in the real world. This mixture between VR and real world environments being particularly adaptable to simulations where the user moves quickly around a given space. For example, a virtual volley ball game can be played where the real world is only faintly visible to a VR user so long as he or she remains near the center of predefined "safe zone" space; however, as the user approaches the perimeter of the "safe zone" space the virtual environment gradually fades with the surrounding real world environment becoming more visible.

In a third general aspect, a mixed reality simulated environment is comprised of a combination of a first real world human superimposed over a simulated environment enabling the resultant mixed reality simulation to be viewed interactively either as a live or recorded feed by at least one other user. This third general aspect may be implemented instead of or in addition to the previously disclosed aspects of this invention. This third general aspect includes the addition of at least one real world camera video feed that is preprocessed and integrated with the virtual simulation itself. This third general aspect being particularly suitable for an instructor or coach to observe the dynamics and full body motion of the first real world human and his or her interactions with the simulated environment rather than just the simulated environment or the first real world human in isolation.

In most of these embodiments, AR/VR mixed reality environmental simulations are provided to enable interactions with real world objects (e.g., golf clubs, tennis racket). The essential concept of the invention is to provide a reliable homogeneous appearing simulated mixed reality environment allowing the user to interact with real world objects with the user's interactions controlling the simulated mixed reality environment including the simulated environment providing feedback to the user.

Objects and advantages of the invention will be set forth in part in the following description, or may be apparent from the present description, or may be learned through practice of the invention. Described are a number of mixed reality mechanisms and methodologies that provide practical details for reliably and securely allowing a user to interact with a simulated environment. Although the examples provided herein are primarily related to AR/VR golf simulations, it is clear that the same methods are applicable to any type of AR/VR simulated environment—e.g., tennis, baseball, dice rolling, Jenga block building, volleyball, soccer, lacrosse.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1A:
FIG. 1A is a representative example isometric view of a prior art golf simulator that provides data metrics feedback in addition to simulation.
Figure 1B:
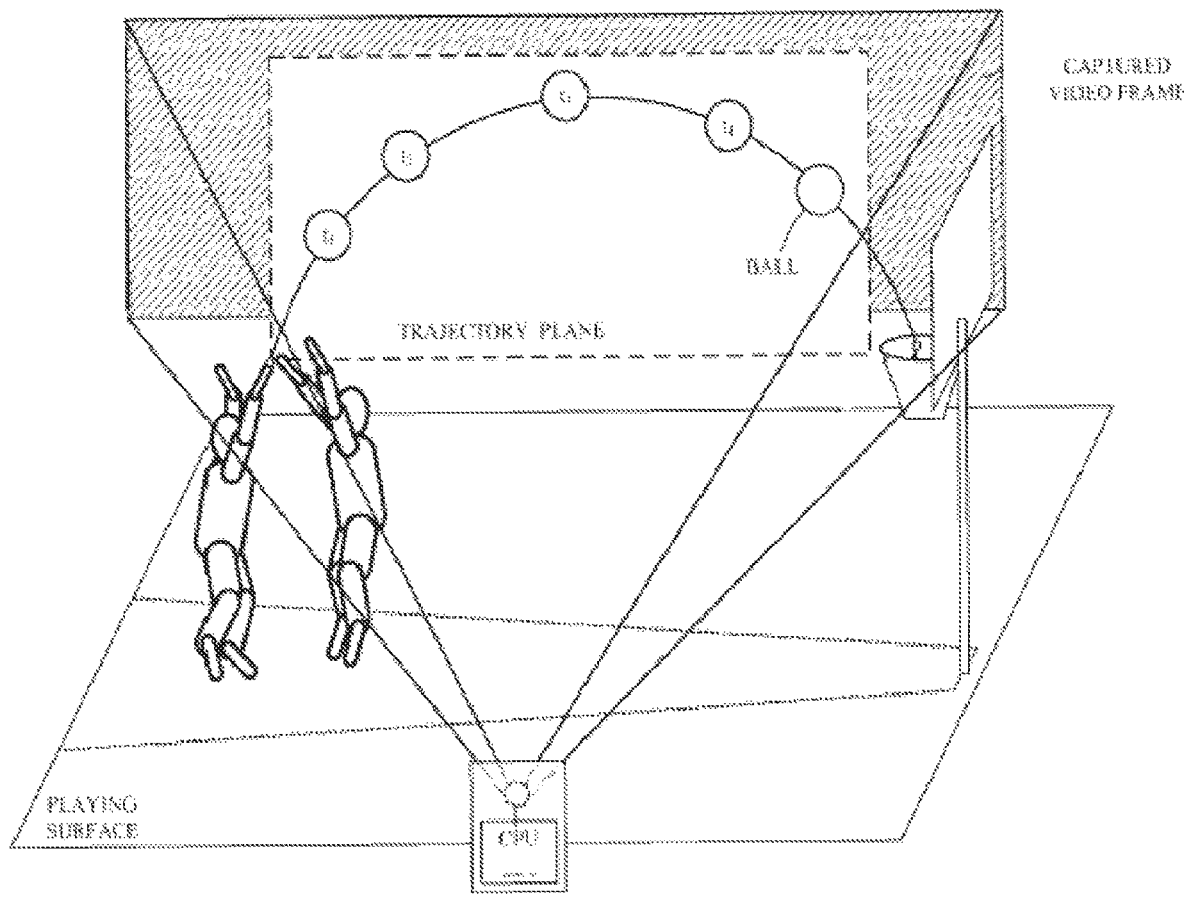
FIG. 1B is a representative example isometric view copied from U.S. Pat. No. 7,854,669 (FIG. 1) showing a first prior art golf simulation.
Figure 1C:
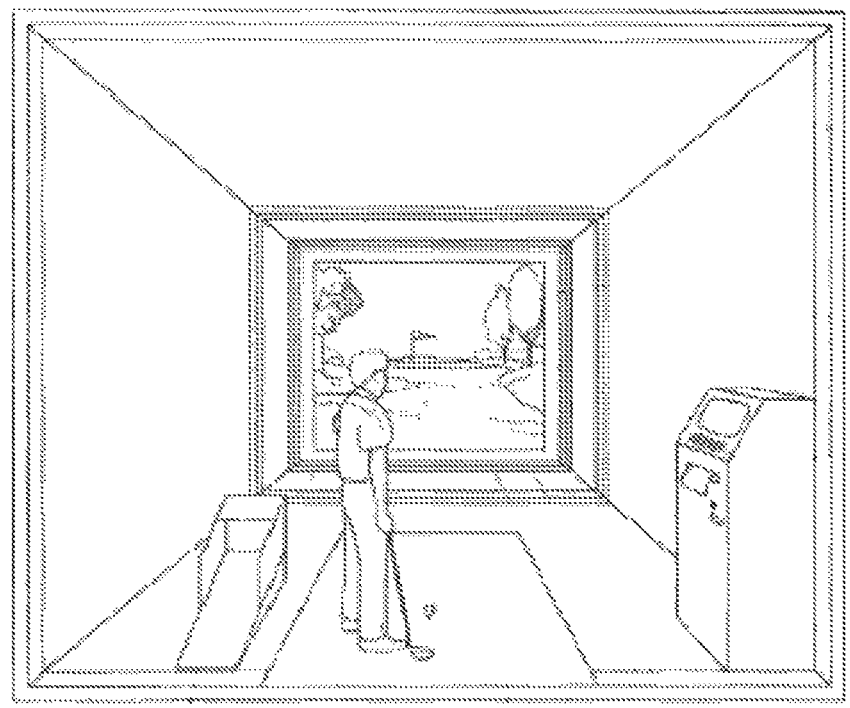
FIG. 1C is a representative example isometric view copied from U.S. Pat. No. 9,764,213 (FIG. 1) showing a second prior art golf simulation.

Certain terminology is used herein for convenience only and is not to be taken as a limitation on the present invention. The words "a" and "an", as used in the claims and in the corresponding portions of the specification, mean "at least one."

This patent application includes an Appendix having a file named Appendix689934-1U3.txt, created on Apr. 28, 2023 and having a size of 27,328 bytes. The Appendix is incorporated by reference into the present patent application. A portion of one preferred embodiment of the present invention is implemented via the source code in the Appendix. The source code in the Appendix is subject to the "Copyright Notice and Authorization" stated above.

The Appendix includes the following parts of software code which is described in more detail below:
Part 1—PassThroughSwitcher
Part 2—IsOverAndLooking
Part 3—HeadUpCode The abbreviations "AR" and "VR" denote "Augmented Reality" and "Virtual Reality" respectively. Augmented Reality (AR) is an interactive experience of a real world environment whose elements are "augmented" by computer-generated perceptual information. While definitions of AR vary depending on the application, in the context of this invention AR denotes constructive (i.e., additive to the natural environment) overlaid visual and possibly audible sensory information seamlessly interwoven into images of the real world. Examples of existing AR platforms are: Apple iPhones®, Android® phones, Google Glass, Microsoft HoloLens, etc. AR augmented computer-generated perceptual information is referred to as "persistent digital objects", or "overlay images", or "visual digital image overlays" interchangeably throughout the specification and claims. Virtual Reality (VR) is an immersive interactive computer generated experience taking place completely within a simulated environment. VR as used in the claims and in the corresponding portions of the specification denotes complete immersion into the computer generated experience with no visual real world environment admitted and may also include audio. Examples of existing VR platforms are: Oculus, Windows Mixed Reality, Google Daydream, SteamVR headsets such as the HTC Vive & Vive Pro, etc.

The terms "mixed reality" or "mixed reality simulations" as used herein refer to a system of displaying a combination of both the surrounding real world immediate environment (with or without AR enhancement) as well as a completely immersive virtual environment via a VR headset in the same session to a human user. The term "video passthrough" as used herein refers to a VR goggle device equipped with two stereoscopic cameras that under some circumstances display to the human user a stereoscopic view of the surrounding real world immediate environment instead of a virtual simulation—i.e., "video passthrough" goggles are completely immersive with the real world only visible via the stereoscopic cameras embedded in the VR goggles (e.g., FIG. 2A, callout 201). The term "artifice" is used in the claims and in the corresponding portions of the specification to denote a virtual copy of a real world object (e.g., user's hands, golf club) that is positioned and moves in real time in the virtual environment in an identical or similar manner to its associated real world counterpart.

The term "opacity" as used herein denotes the degree of transparency or opaqueness of a virtual environment superimposed over the surrounding real world immediate environment. An opacity of 100% would denote 100% opaqueness of the virtual simulation (i.e., no portion of the surrounding real world immediate environment would be visible to the user) and an opacity of 0% would denote complete transparency of the superimposed virtual environment (i.e., only the surrounding real world immediate environment would be visible to the user). However, it should be understood that even with a virtual simulation opacity of 0%, augmented overlays covering only a portion of the surrounding real world immediate environment may nevertheless be present when operating in AR mode.

Reference will now be made in detail to examples of the present invention, one or more embodiments of which are illustrated in the figures. Each example is provided by way of explanation of the invention, and not as a limitation of the invention. For instance, features illustrated or described with respect to one embodiment may be used with another embodiment to yield still a further embodiment. It is intended that the present application encompass these and other modifications and variations as come within the scope and spirit of the invention.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

Figure 2A:
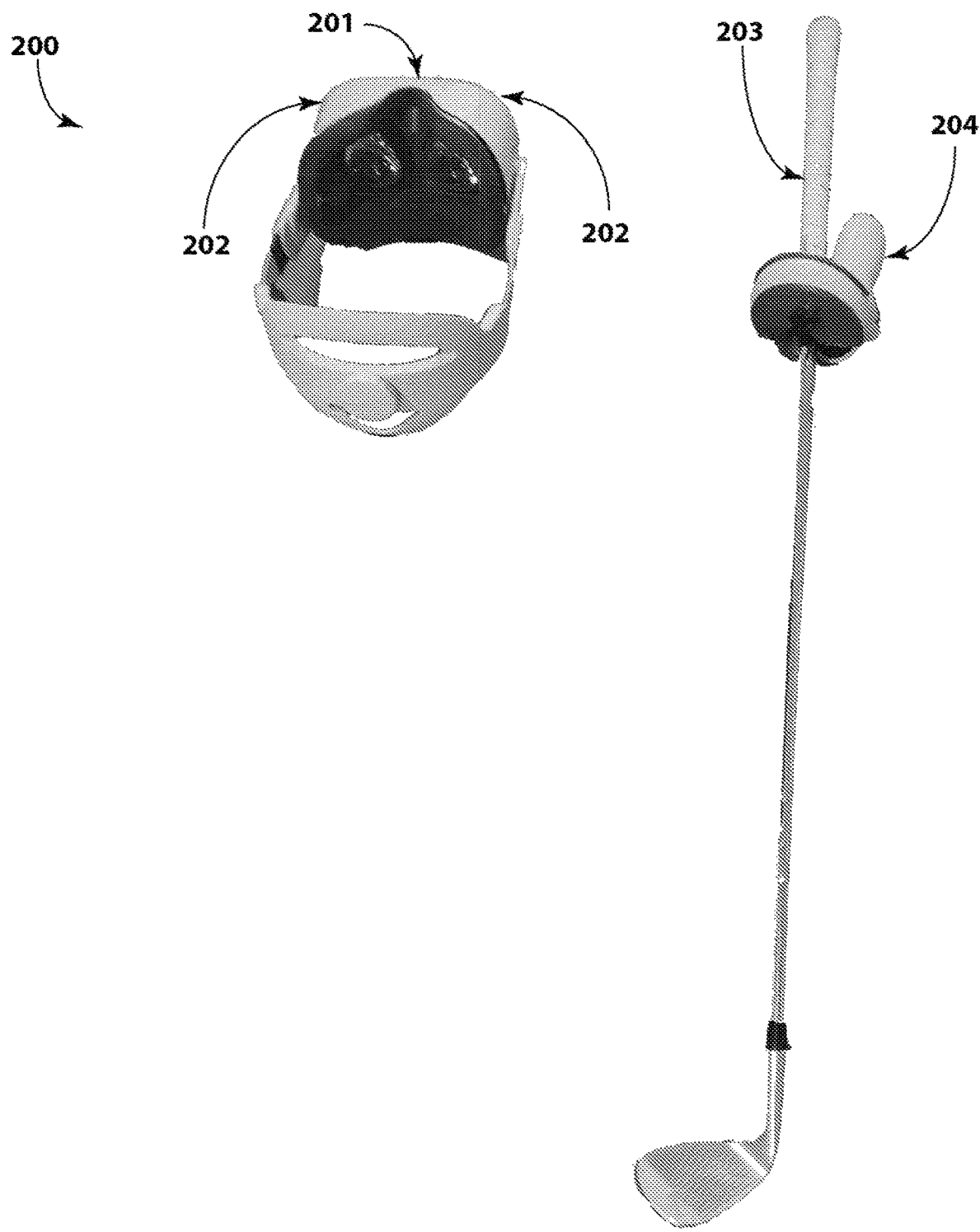
FIG. 2A is a representative example isometric view of mixed reality headgear and real world sporting equipment with a clip-on tracking mechanism in compliance with this disclosure.

FIG. 2A provides an exemplary illustration 200 of an immersive mixed reality AR/VR goggle device 201 and associated real world object (golf club 203) that comprise part of the system required to conduct a mixed reality golf sports simulation. Preferably, the AR/VR video device 201 is capable of video passthrough and therefore includes two stereoscopic cameras 202 to display real time stereoscopic images of the surrounding real world immediate environment or a virtual environment depending on the control settings of the system at a given time. When operating in video passthrough mode, goggle device 201 can also display augmented reality supplementing the surrounding real world video feed garnered by the stereoscopic cameras 202. The use of stereoscopic video passthrough is significant, since video passthrough allows for a much larger augmented reality Field Of View (FOV) compared to prior art stereoscopic see-through AR goggles. For example, a standard size notebook at arm's length from the user's eyes is approximately the same size of the AR window experienced when viewing anchored and 3D virtual objects with prior art see-through AR glasses. However, with stereoscopic video passthrough AR/VR goggle device 201, the AR window (i.e., the area where anchored virtual objects or overlays can appear) is essentially the entire human user's Field Of View (FOV). Additionally, stereoscopic video passthrough AR/VR goggle device 201 also ensures that the user's depth perception remains intact and undistorted.

A clip-on device 204 (e.g., Oculus left-hand controller) is attached to golf club 203 to allow the AR and VR system to track the club's motion in the real world. Optionally, the clip-on device 204 includes an audio source that can provide sonic feedback of where the golf club 203 is positioned during a golf swing. Preferably, both clip-on device 204 and goggle device 201 utilize six degrees of freedom (6 DoF) tracking (i.e., ±Pitch, ±Yaw, and ±Roll), thereby providing the ability to anchor virtual objects (e.g., virtual golf ball) with respect to the real world while operating in AR mode as well as provide an artifice of the golf club 203 that precisely mimics the real world golf club's motions when operating in VR mode.

Figure 2B:
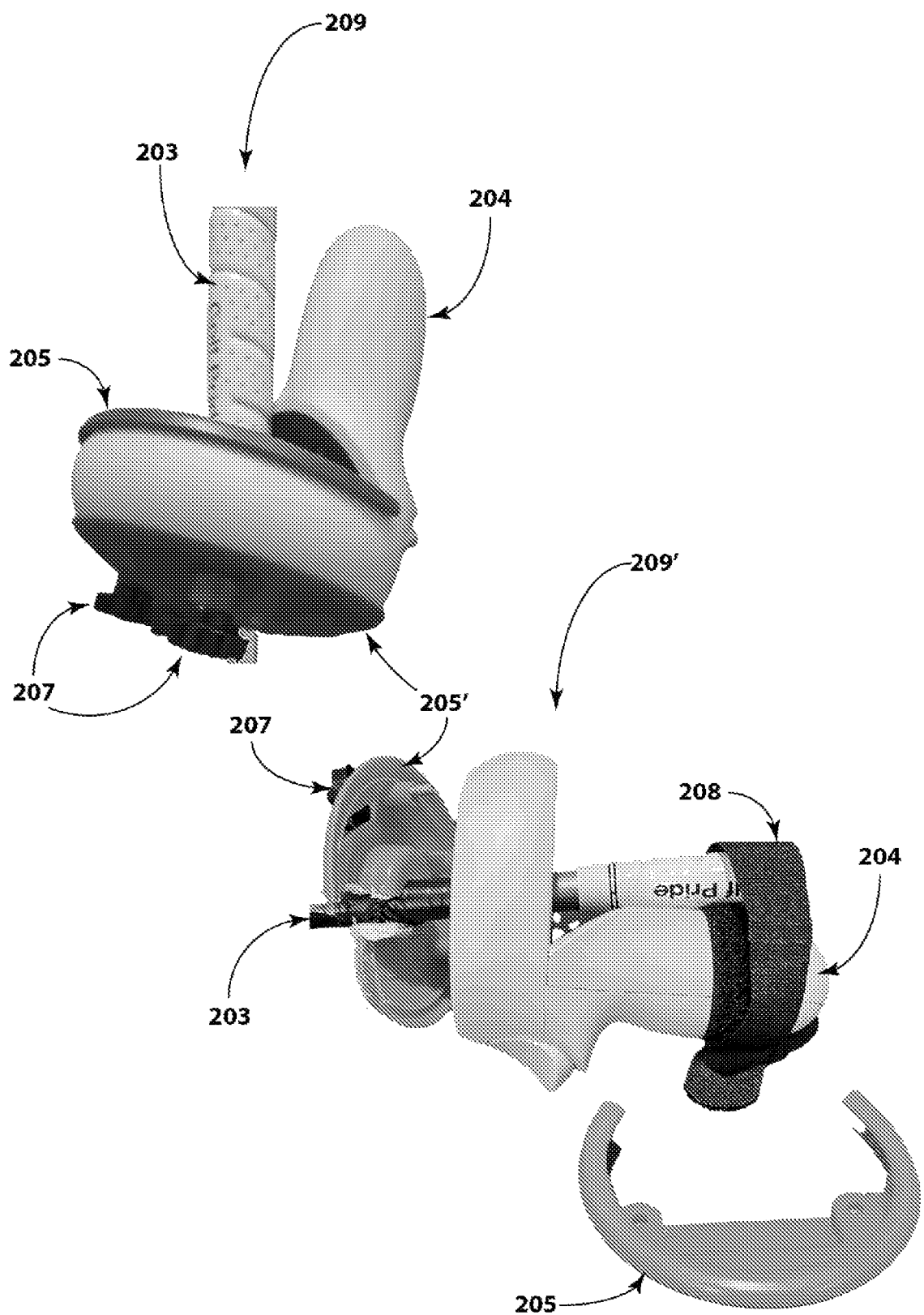
FIG. 2B is a detailed representative example isometric view of the clip-on tracking mechanism of FIG. 2A.

This is not to imply that the system that conducts a mixed reality golf sports simulation need be custom built for this application. For example, FIG. 2B illustrates two views (209 and 209') of the same embodiment which uses a standard off-the-shelf Oculus Quest 2 VR headset and controllers as an integral part of the mixed reality golf sports simulation system. As shown (209 and 209') in FIG. 2B, the left-hand Oculus Quest 2 controller 204 is physically attached to the real world golf club 203 with a custom plastic clam shell holder (205 and 205') that includes two screw knobs 207 that connect the lower portion 205' of the clam shell to the upper portion 205 thereby physically securing the off-the-shelf Oculus Quest 2 controller 204 in a fixed position relative to the real world golf club 203. Optionally and preferably, the off-the-shelf Oculus Quest 2 controller 204 may additionally be secured to the real world golf club 203 with a Velcro strap 208 that wraps around both the controller 204 as well as the real world golf club 203. Thus, with the exemplary mechanical attachment (209 and 209') an off-the-shelf Oculus Quest 2 controller 204 can be physically connected to a real world gold club 203, thereby allowing the controller's 204 built-in motion sensing capacities (e.g., 6 DoF, X/Y/Z tracking, velocity) to be garnered to model an accurate representation of the real world golf club's 203 motions.

As is apparent to one skilled in the art, the utility of the exemplary clam shell holder embodiment (205 and 205') of securing an off-the-shelf Oculus Quest 2 controller 204 is not necessarily limited to real world golf clubs or the Oculus brand of VR controllers but can be readily adapted to other real world sporting equipment. For example, the exemplary clam shell holder embodiment (205 and 205') can be slightly modified to accommodate larger diameter and/or irregular shafts typical of baseball bats, tennis rackets, pickle ball paddles, ping pong paddles, etc.

FIGS. 2C thru 2G taken together, illustrate one general embodiment of this invention providing a mixed reality simulation and training session of a golf game with relatively inexpensive portable equipment in a reasonably small real world space. FIGS. 2C thru 2G are arranged in chronological order starting with the human user setting up a golf shot (FIG. 2C, callout 210), progressing through a golf swing (FIGS. 2D and 2E, callouts 220 and 230 respectively), and culminating with the golf swing follow through (FIGS. 2F and 2G, callouts 240 and 250 respectively).

Figure 2C:
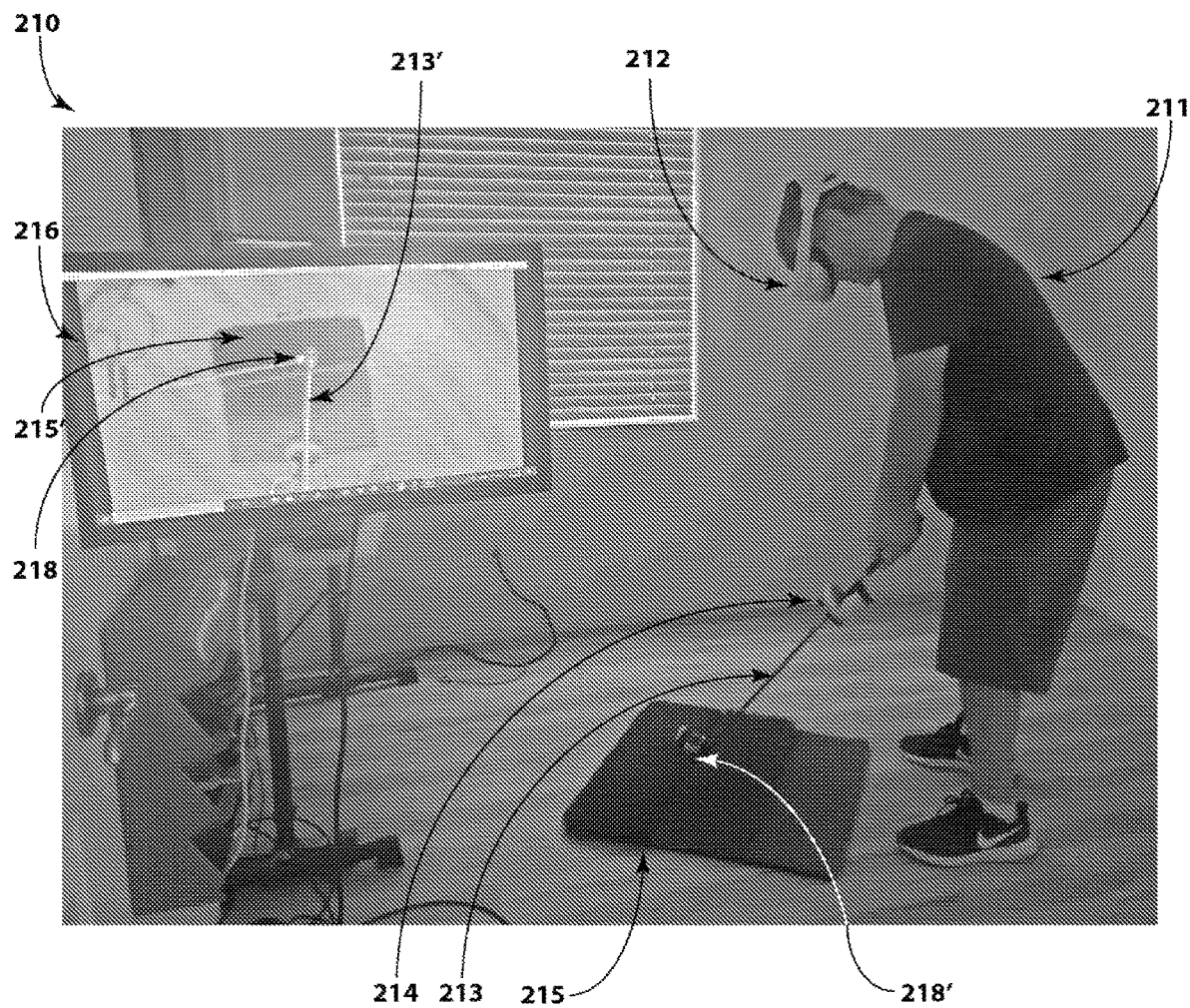
FIG. 2C is a first representative example isometric view of a user aligning a real world golf club to a virtual golf ball using the devices and system of FIG. 2A.

Starting with FIG. 2C, as illustrated the user 211 is wearing the AR/VR video device 212 of FIG. 2A (illustrated as callout 201 in FIG. 2A) equipped with 6 DoF and stereoscopic video passthrough. The user 211 (FIG. 2C) is holding a golf club 213 equipped with a 6 DoF clip-on tracker 214 to allow the mixed reality system to track the golf club's 213 motion throughout the simulation. As shown, the user 211 is lining up his shot on a simulated turf mat 215 with no specific AR or VR enhancements. Flat screen 216 is displaying what the user 211 is seeing which is not normally a component of the mixed reality system and is included in this exemplary disclosure 210 for illustrative purposes only.

As shown on flat screen 216, the user 211 is seeing the surrounding real world environment via the stereoscopic video passthrough AR/VR goggles 212 with the real world turf mat 215' and golf club 213' readily apparent on the screen 216. However, as also shown on screen 216, the user 211 is additionally seeing an augmented reality three-dimensional (3D) appearing golf ball 218 that is completely virtual and not present in the real world 218'. Thus, while the user 211 in this mixed reality simulation 210 is visually lining up a golf shot with a virtual ball 218, no physical ball is present 218'.

Figure 1D:
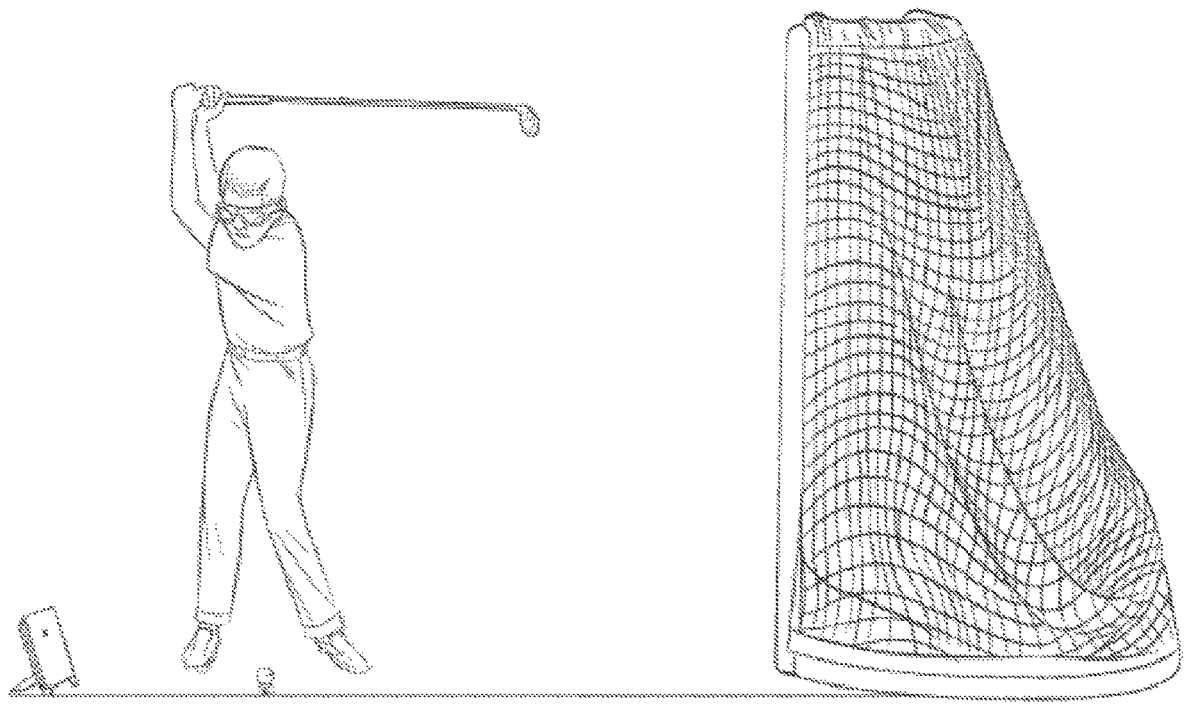
FIG. 1D is a representative example isometric view copied from U.S. Pat. No. 10,646,767 (FIG. 7) showing a third prior art golf simulation.

While this disclosed mixed reality golf training simulation 210 can be configured to accommodate the user 211 lining up and hitting a real world golf ball, it is not preferred. As shown in FIG. 1D, the use of a real world golf ball in the mixed reality golf training simulation system necessitates the addition of a large net for indoor spaces to catch any hit golf balls and consequently has the disadvantages of: reduced portability, increased real world operational room size requirements, and the non-immersive logistical problems associated with exiting and reentering the simulation to retrieve hit balls. In contrast, with the preferred embodiment of utilizing a virtual golf ball 218 (FIG. 2C) for lining up and hitting a shot, the mixed reality golf training simulation system has the benefits of smaller size requirements, increased portability, and greater simulation immersion. This is a significant advantage of this disclosure over legacy prior art golf simulation systems that typically relied on hitting physical golf balls to monitor the hit ball by video and/or radar to accurately calculate the ball's trajectory and proximity to its final target. Additionally, the prior art simulators' use of see through goggles for AR and optionally VR without the benefit of 6 DoF tracking made fixing a virtual 3D appearing golf ball in a fixed real world space problematic.

Figure 2D:
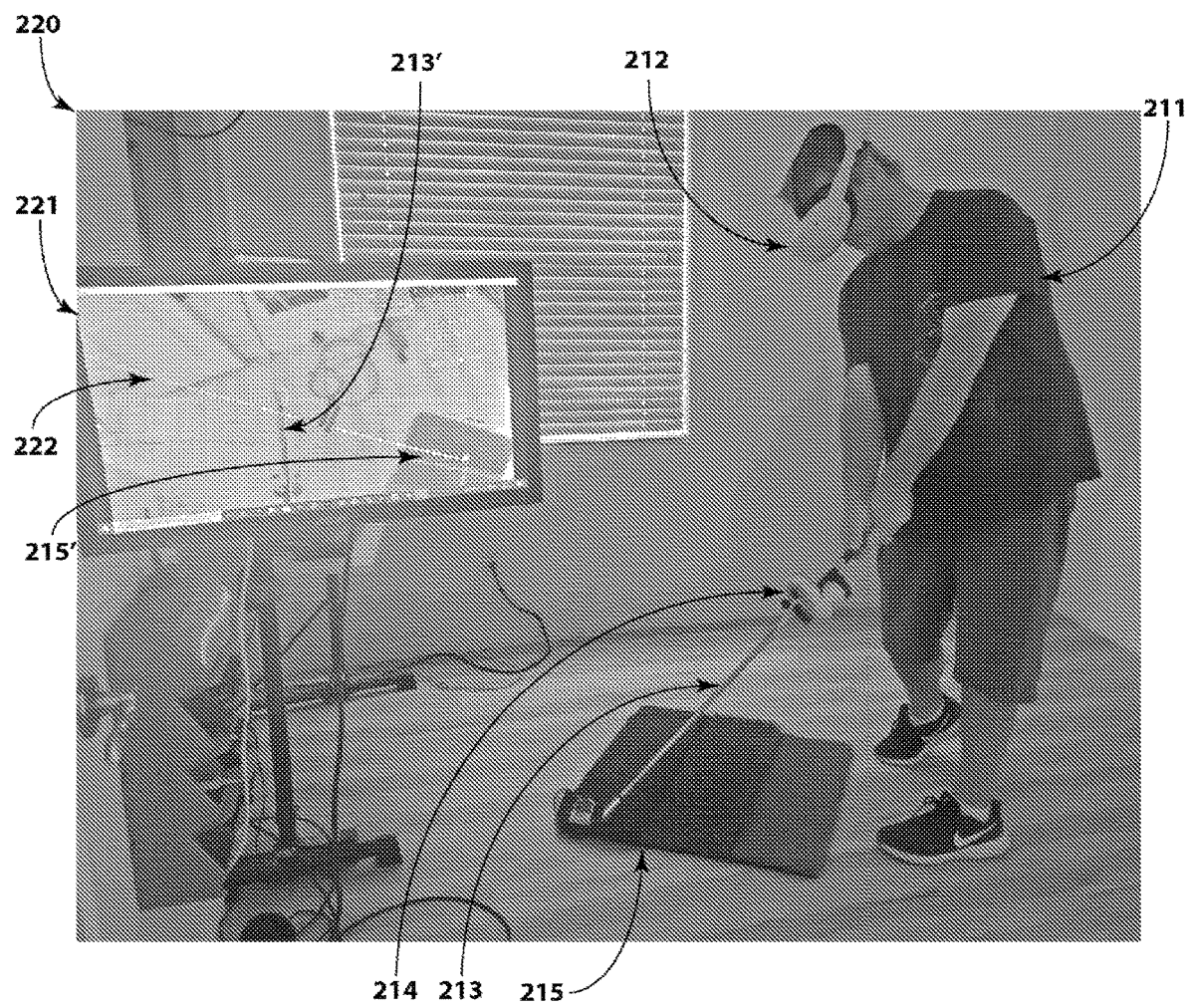
FIG. 2D is a second representative example isometric view of the user of FIG. 2C a short time after hitting the virtual golf ball.

Moving onto FIG. 2D, in this illustration 220 the user 211 has started his golf shot with the user 211 still seeing the surrounding real world environment via the stereoscopic video passthrough AR/VR goggles 212 with the real world turf mat 215' and golf club 213' readily apparent on the screen 221. However, since illustration 220 displays a moment in time shortly after the user 211 has "hit" the virtual golf ball, the virtual golf ball is traveling on a virtual trajectory (shown in AR as callout 222) and has already traveled further than the user's field of view as shown on screen 221. Optionally and preferably, if the golf club's 213 clip-on tracking device 214 is equipped with an audio speaker the device can simulate the sound of a golf ball being hit the moment the physical club would have impacted the virtual ball.

Figure 2E:
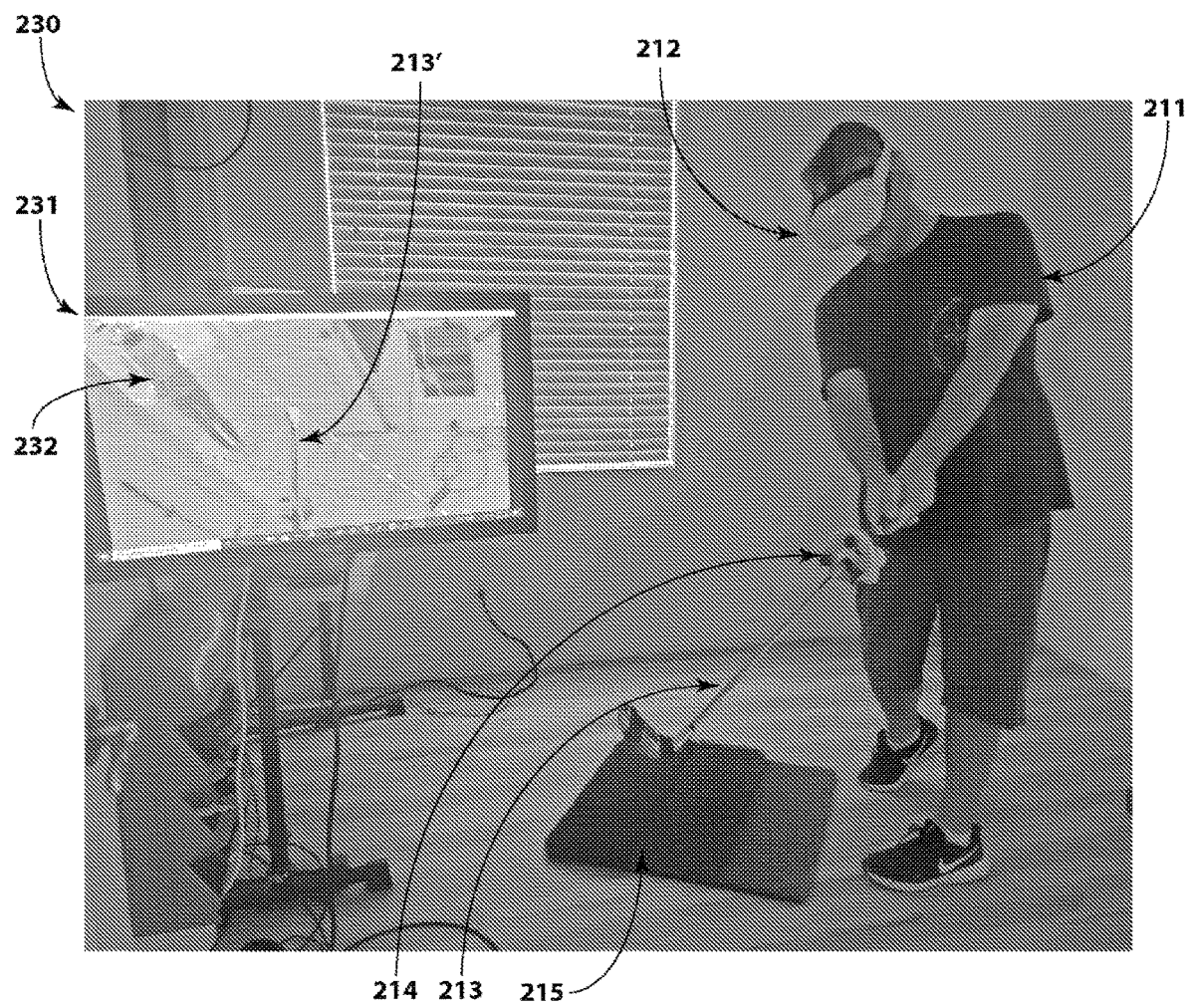
FIG. 2E is a third representative example isometric view of the user of FIGS. 2B and 2C a short time after FIG. 2D.

FIG. 2E illustrates 230 a moment in time shortly after FIG. 2D where the user 211 (FIG. 2E) is completing his swing and starting to look up from the mat 215 and point of "impact." As shown on screen 231, the user 211 is still seeing the surrounding real world environment and his golf club 213' via the stereoscopic video passthrough AR/VR goggles 212 with his field of view now perceiving other portions 232 of the immediate environment.

Figure 2F:
FIG. 2F is a fourth representative example isometric view of the user of FIGS. 2B thru 2D a short time after FIG. 2E.
Figure 2G:
FIG. 2G is a fifth representative example isometric view of the user of FIGS. 2B thru 2E after completing the golf swing.

With FIG. 2F the user 211 is beginning his follow through with his head up—i.e., looking more up than down. In this illustration 240, as shown on screen 241, the user is no longer seeing his surrounding environment, rather the user 211 is now seeing a portion of a simulated virtual golf course 242 with his view of his physical golf club 213 replaced by an associated artifice of the golf club 243 that moves in the virtual environment 242 in a similar manner as the golf club 213 in the real world. Finally, as shown 250 in FIG. 2G the user 211 has completed his swing with his head up continuing to see a portion of a simulated virtual golf course 252 such that the user 211 can see where his virtual ball landed on the simulated virtual golf course 252.

Thus, the disclosed mixed reality simulation is a combination of AR and VR where the transition between AR and VR is determined, in this embodiment, by where the user is looking at any given time and his body position. This combination of AR for the physical swing of the golf ball followed by VR in essence allows the simulator to exploit the best capabilities of both technologies. While the recent advancements in VR hardware and software have led to compelling VR experiences, in the special case of sports simulation (i.e., where real world objects move through 3D space at rapid velocities that may change suddenly) VR has been unable to allow the user to experience a simulated environment in a natural way.

For example, consider what happens when a golfer swings a club. The golfer is swinging an object that weighs about a pound and is moving at approximately 120 mph. For safety reasons alone, the golfer user needs to be aware of their surroundings. Depth perception is also critical because the golf player is trying to deliver the object (golf club) to another object (golf ball) about six feet away from their head, ideally to a point that is approximately the size of a dime—i.e., the center of the golf ball. Thus, with the prior art, the task of swinging a real world golf club and hitting a virtual golf ball in VR is practically untenable. However, with this disclosure and the use of video passthrough coupled with 6 DoF capabilities, interacting with real world sporting equipment in an AR environment and programmatically switching to a VR environment, a mixed reality simulation becomes possible.

With this disclosure, while the user is looking down at the (virtual) ball and getting ready to hit the virtual golf ball, the user also sees the real environment. This ensures that the player can maintain awareness of their periphery for safety as well as receiving real world visual feedback to their actions in real time. When the user swings a real world golf club the user sees the real world mixed with AR. When the user starts to complete their follow through, the AR simulation seamlessly transitions to VR. This natural move every golfer makes triggers entry into VR where the golfer can watch the virtual golf ball they just "hit" interacting with its virtual environment. The automatic transitioning from AR to VR and vice versa also enables simulation and practice on golfing chip shots (i.e., 80 yards or less) where the user repeatedly looks at the ball and the target trying to find the match between what the user is visually sensing and "just the right amount of force" to hit the ball. With prior art simulation and training systems, this type of repeated visual distance feedback coupled with an AR real world view of the ball has not been possible.

Figure 3A:
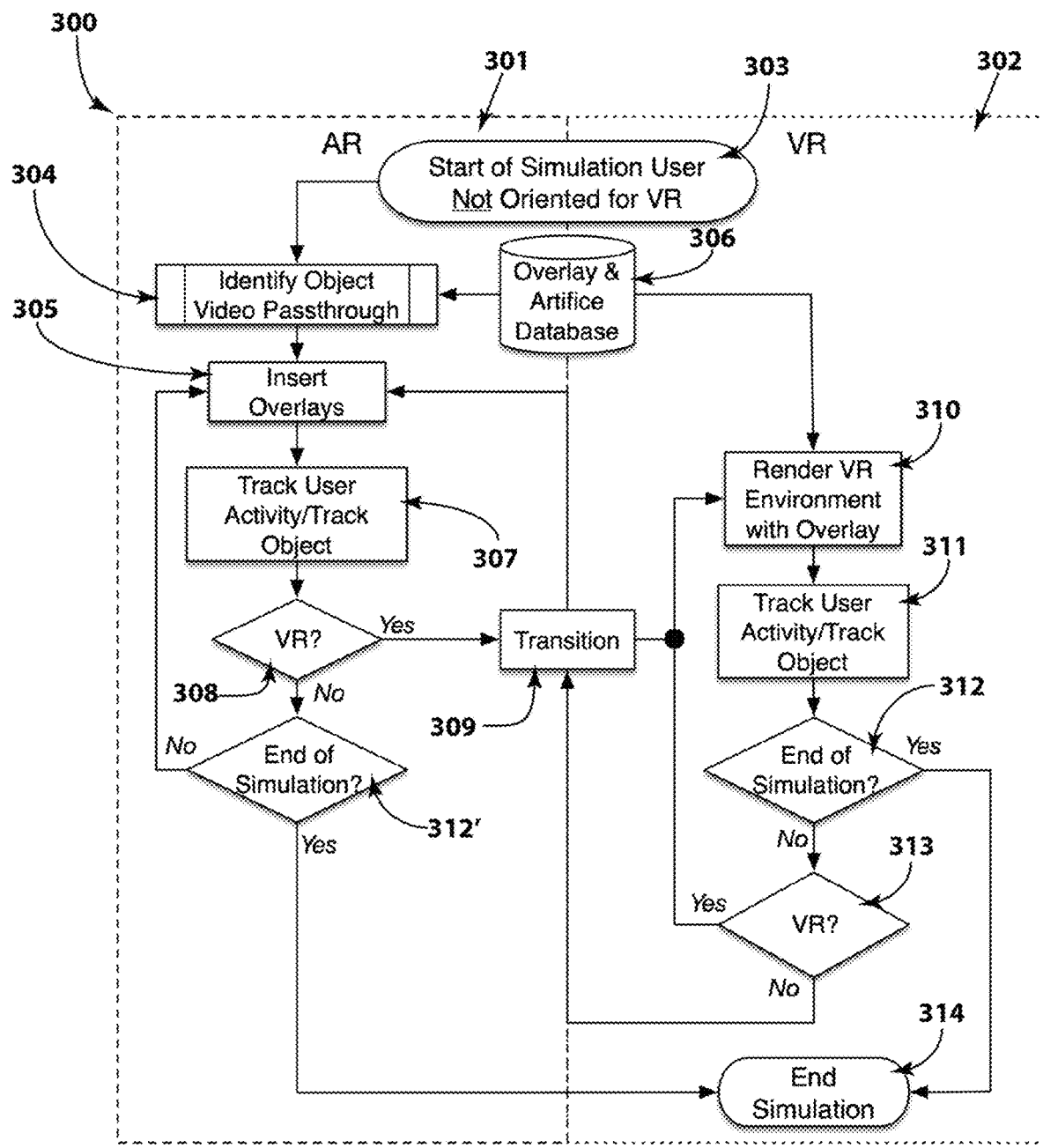
FIG. 3A is an overall swim lane block diagram representative example providing a schematic graphical overview of a general embodiment of the system associated with generating and maintaining a mixed reality simulation environment.
Figure 3B:
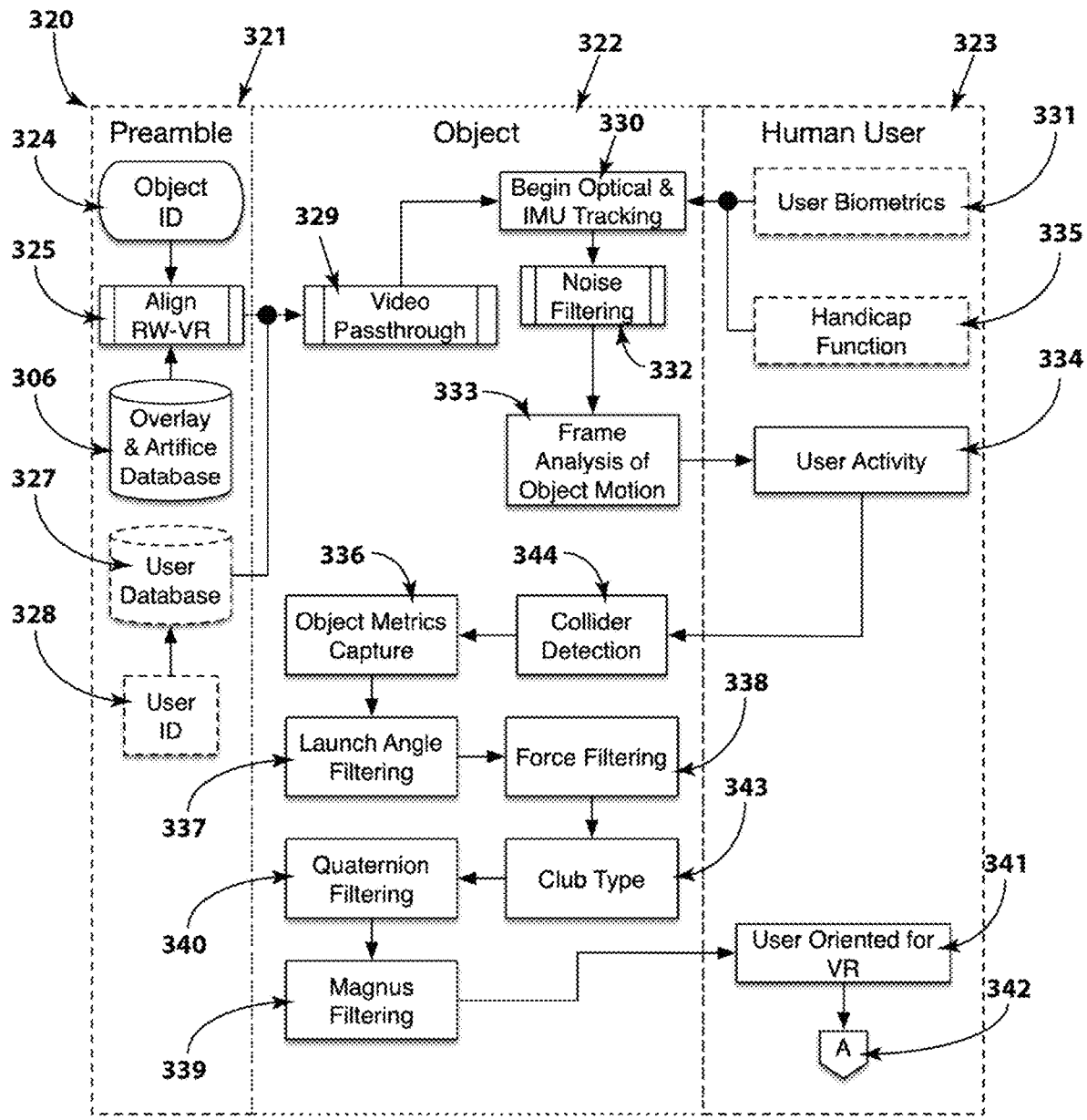
FIG. 3B is a swim lane block diagram representative example providing a schematic graphical overview of a specific embodiment of the system of FIG. 3A associated with acquiring and tracking a real world object in AR.
Figure 3C:
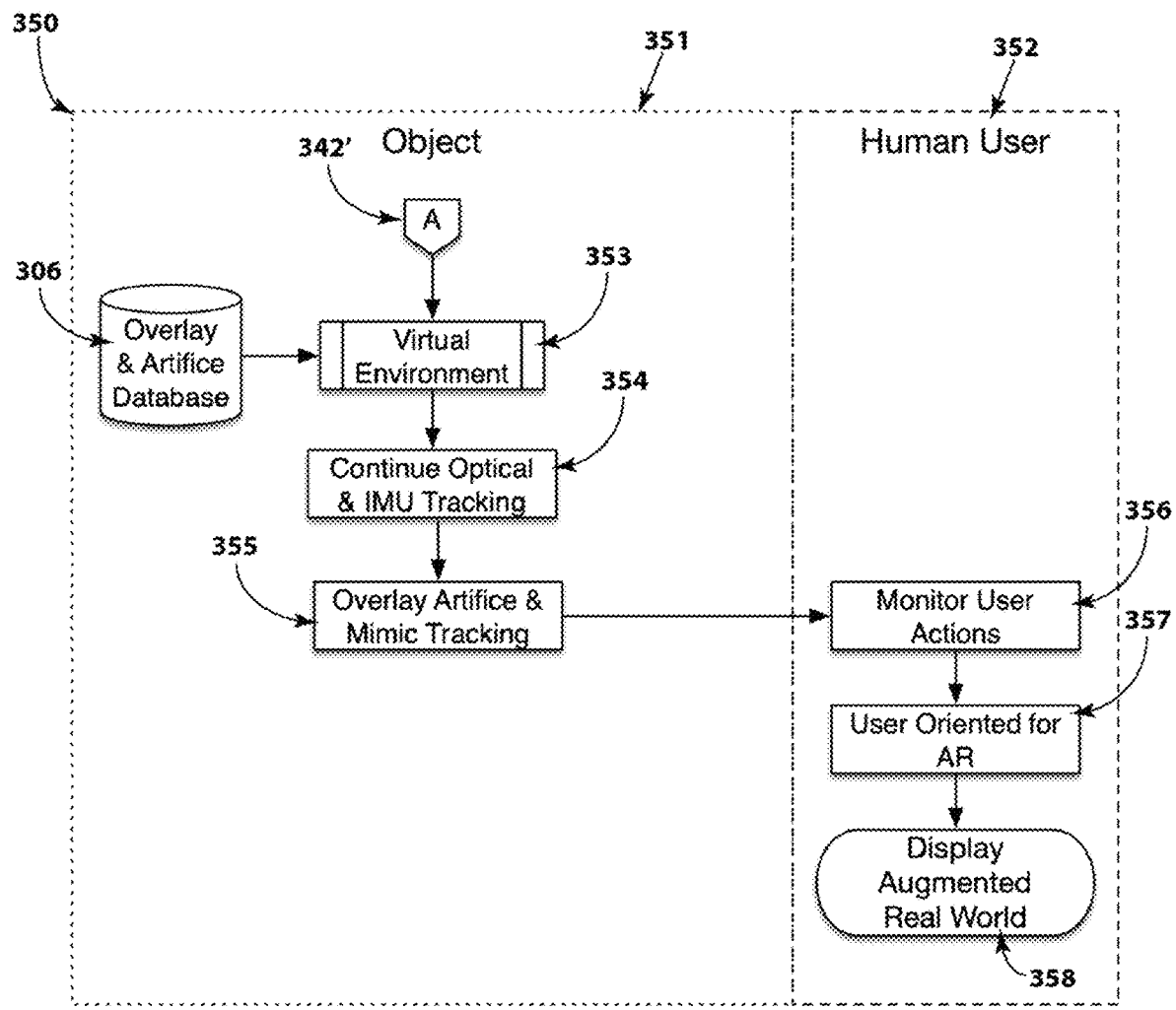
FIG. 3C is a swim lane block diagram representative example providing a schematic graphical overview of a specific embodiment of the system of FIGS. 3A and 3B associated with tracking a real world object in VR.

FIGS. 3A thru 3C taken together, illustrate one specific embodiment of this invention providing mixed reality simulation and training of a golf game. FIG. 3A provides a broader overview of the overall flow of the mixed reality simulation showing a transition from AR to VR mode in this example. FIGS. 3B and 3C provide more detailed "under the hood" views of the AR and VR portions (respectively) of the mixed reality simulation of FIG. 3A.

FIG. 3A illustrates an overall swim lane block diagram representative example 300 of a specific embodiment of the system associated with generating and maintaining the mixed reality simulation environment of FIGS. 2B thru 2F with an external object equipped with an associated tracker and a pair of stereoscopic AR/VR goggles. While it should be appreciated that the overall swim lane block diagram of FIG. 3A is compatible with the exemplary embodiment of FIGS. 2B thru 2F, the same general concepts are also applicable to other embodiments of mixed reality simulation environments.

As illustrated in the swim lane flowchart 300 of FIG. 3A this specific embodiment of the invention is conceptually divided into two groups (i.e., AR 301 and VR 302) by the two "swim lane" columns as shown in the figure. If a particular flowchart function appears completely within a swim lane, its functionality is limited to the data category of the associated swim lane—e.g., Insert Overlays 305 is exclusive to the AR process. If a particular flowchart function straddles both swim lanes its functionality is shared between both groups—e.g., Start of Simulation User Not Oriented for VR 303 could theoretically initiate either the AR or VR portion of the mixed reality simulation.

Referring to the swim lane high level architecture diagram 300 of FIG. 3A, the process 303 begins with the user initiating the simulation and in this example embodiment the orientation of the user's head and body (i.e., user within a predefined space close to AR feet overlays and user is looking down—as monitored by the stereoscopic AR/VR goggles) causes the simulation to begin in AR 301 mode with a view of the real world immediately surrounding environment 304 enhanced with AR overlays 305. Typically, at the start of the simulation the user will identify the real world object 304 (e.g., nine iron golf club) that is to be tracked throughout the simulation and if necessary place an associated tracker on the real world object and calibrate the real world object's movement to align with its associated artifice during VR simulation. Once the real world object is identified and tracked 304, simulation AR overlays 305 are inserted into the user's field of view. These overlays (e.g., virtual golf ball, length and Par sign for the virtual hole) are preferably pre-generated and stored in an associated database 306 to expedite AR overlay display.

At this point, the AR portion of the simulation enters an infinite loop waiting for the user to generate an activity (e.g., swing golf club, voice command) while maintaining the appropriate AR overlays in the correct position in the field of view of the real world surroundings 307. Also, during this AR mode, the system continuously checks the user's orientation confirming that the system should remain in AR mode 308. When the system detects that the user's head is looking up (e.g., after hitting a shot, judging the distance to the hole in the simulated virtual landscape) and is positioned within a predefined area, the system transitions from AR to VR mode with the passthrough view of the real world replaced with the immersive VR simulation 309 (typically displayed at 100% opacity). Conversely, when the user's head returns to a downward orientation or the user steps out of the predefined area the system returns the user's view to AR mode with see through video passthrough of the real world immediate surroundings. Of course, as is apparent to one skilled in the art there are other methodologies for initiating AR/VR transitions that may under some circumstances be more desirable. For example, a transition from AR to VR may be initiated only if both the user's head looks up and the swing of a golf club has also been detected.

This transition from AR to VR (or vice versa) 309 can be a simple switch from AR with a view of the real world immediately surrounding environment changing to the VR simulation instantaneously. Alternatively and preferably, the transition from AR to VR (or vice versa) can be a gradual video dissolve from the real world immediately surrounding environment to the VR simulated environment 302 over a predetermined time period. The exact timing of this preferred video dissolve will vary depending on the simulation, but in the exemplary golf simulation and training simulation of FIGS. 2B thru 2F the video dissolve would typically happen over a time period of approximately 1.5 seconds. The video dissolve effect being preferred over an abrupt visual switch because the video dissolve effect provides a more seamless transition from the real world to the virtual world (or vice versa) tending to be less abrupt and consequently less disorientating to the user.

Regardless of the type and timing of the transition from AR to VR 309, once the handoff from AR 301 to VR 302 is completed, the tracking of the real world object 310 as well as the user's motions 312 are assumed by the immersive VR simulation 302. However, when operating in VR simulation mode 302, the real world live image of the object is substituted with a digital artifice rendering 310 of the object moving in a similar fashion in the VR simulation as the real world object. The digital artifice of the real world object being typically rendered from a virtual database 306 of identified objects.

Whenever a user activity occurs the system checks to determine if the user is terminating the simulation (312 or 312') and if the answer is "No" the simulation continues with the system continuously checking the user's head orientation 313 (or other specified actions) to determine if the simulation should continue in VR mode 302 or switch back to AR mode 301 with real world views. Alternatively, if the user elects to terminate the simulation 312 or 312', the system will end the simulated mixed reality environment 314.

FIG. 3B illustrates a more detailed swim lane block diagram representative example 320 of the specific embodiment of the AR portion of the system associated with generating and maintaining the mixed reality simulation environment of FIG. 3A. While it should be appreciated that the overall swim lane block diagram of FIG. 3B is compatible with the exemplary embodiment of FIG. 3A, the same general concepts are also applicable to other embodiments of mixed reality simulation environments.

As illustrated in the swim lane flowchart 320 of FIG. 3B this detailed specific embodiment of the AR portion of this invention is conceptually divided into three groups (i.e., Preamble 321, Object 322, and Human User 323) by the three "swim lane" columns as shown in the figure. As before, if a particular flowchart function appears completely within a swim lane, its functionality is limited to the data category of the associated swim lane—e.g., User Biometrics 331 is exclusive to Human User group 323.

The process 320 begins in the Preamble group 321 with the real world object being identified 324 (e.g., golf drive, golf putter, tennis racket, badminton racket) and categorized with the mixed reality simulation system with an associated 3D virtual artifice of the real world object copied from the Overlay & Artifice Database 306 into the simulation. Once the real world object is identified 324 with its associate artifice copied 306, the Real World (RW) object and the associated VR artifice are aligned with each other 325 such that the VR artifice will move in a similar manner to its associated RW object during the VR simulation.

Optionally, the user may uniquely identify himself/herself 328 to the mixed reality simulation system 320 with the potential added advantage of retrieving prestored biometrics (e.g., user's height, user left or right handed, user's weight) from a User Database 327 describing the user typically enhancing the accuracy of the mixed reality simulation system 320. Additionally, by uniquely identifying the user 328 to the mixed reality simulation system 320, historical user data (e.g., golf score, handicap) can also be retrieved from the User Database 327 that can also be employed to enhance the mixed reality simulation.

Once the Preamble 321 processes are completed, the mixed reality simulation of this example configures the stereoscopic AR/VR goggles to AR Video Passthrough mode 329 and then progresses to monitoring and responding to both the RW Object's 322 and the User's 323 activities. The RW object 322 is continuously tracked by both optical cameras as well as Inertial Measurement Unit (IMU) data 330 provided by the clip-on tracker (e.g., FIG. 2B).

While the mixed reality simulation system 320 (FIG. 3B) also continuously monitors the user for any activity 334 (e.g., head motion, hand motion, voice command) in an optional and preferred embodiment live real time biometrics of the user are garnered 331 that can potentially enhance the accuracy of the mixed reality simulation. The exact type of user real time biometrics garnered 331 may vary depending on the simulation (e.g., 6 DoF headset tracking, heart rate, real time body tracking, foot pressure plates), the significant concept being that the user real time biometrics are acquired to enhance the accuracy of the mixed reality simulation. In another optional embodiment, a less competent user may elect to activate a Handicap Function 335 to alter simulation play. This Handicap Function 335 can be utilized by the less competent user to either modify the simulation to employ more forgiving algorithms to make game play easier (e.g., the virtual ball is always struck on the theoretical correct position of the clubface regardless of the actual club placement, the clubface angle is less important than the club path) or provide various "tools" to allow the less competent user to modify their play or their opponent's play in order to become more competitive with head to head game competition—e.g., the less competent user may be given a limited number of mini "black holes" that gravitate their hit virtual ball to the hole, or the less competent user can be given one or more "mud balls" that can be inserted into their more experienced opponent's play to apply a random sidespin force creating a certain amount of unpredictability, or the less competent user could be given a golf ball that responds to some verbal commands such as "sit" which reduces the virtual ball's speed by 10%.

Returning to the RW object tracking (golf club in this example) with at least the optical and IMU data acquired 330, when the user moves the RW object golf club a Three-Dimensional (3D) Vector (Vector3) of the RW object golf club head motion is calculated to create a 3D vector tangent to the club head's arc swing over a finite number of discrete video frames (e.g., one video frame recorded every 16 milliseconds or "ms") thereby providing metrics for the RW object's club swing arc. Additionally, quaternions or versors modeling the RW object golf club head's rotation are also derived from optical and IMU data with the quaternion data inserted into the video frames as metadata. Digital noise filtering 332 is then applied to the acquired optical and IMU data 330 of the RW object golf club. While there are many possible digital filter configurations (e.g., low pass, bandpass) a Kalman filter is preferred for this particular application due to its inherent ability to reduce system measurement noise over time (i.e., RW object golf club swing) by estimating a joint probability distribution over the metric variables present in each video frame.

After the initial noise filtering 332 is completed, the Vector3 lengths and orientations derived from the RW object golf club motion in 3D space for each video frame are accumulated 333. The differences between the Vector3 values for each video frame being the basis of calculating the RW object golf club's acceleration, club path, and spin to be imparted to the virtual golf ball in the mixed reality simulation. Optionally, the User Activity 334 (e.g., hand positions, body twist, foot pressure on each pressure plate) metrics may also be collected and added to the mixed reality simulation as metadata.

Each RW object golf club head is assigned (when first identified 324 by the database 306) a virtual "collider" that is essentially virtually positioned on the RW object golf club head in the ideal area where the RW object golf club head should theoretically contact the virtual golf ball. The virtual golf ball also has a collider assigned to it positioned in the theoretical ideal area where the RW object golf club head should contact the virtual golf ball. A predefined 3D "hitting zone" is constructed around the immediate area of the virtual golf ball—e.g., at a video frame rate of 16 ms per frame, the RW object golf club will travel approximately 30 cm between each frame during a typical golf swing, equating to a hitting zone of ±15 cm around the center of the virtual golf ball. Whenever the RW object golf club head collider is detected within the hitting zone as part of an arc swing, the virtual golf ball is deemed "hit" by the system 344. Since the hitting zone is inherently significantly larger than the virtual golf ball, the point of virtual impact between the RW object golf club head and the virtual golf ball is interpolated 336 from the captured video frame data when the RW object golf club head collider is detected within the hitting zone 344.

When a video frame is captured whenever the RW object golf club head collider is detected within the hitting zone of the virtual golf ball a "hit" 344 is assumed with the interpolated Vector3 proximity and orientation of the RW object golf club head and the virtual golf ball colliders relative to each other becoming one contributor to the virtual golf ball's future calculated trajectory. The inherent video frame quantization noise (e.g., samples only every 16 ms) can optionally and theoretically be reduced by calculating a vector of the $\chi$ and $\xi$ axis RW object golf club head and virtual golf ball colliders position and orientation relative to each other multiplied by a constant derived from real world testing (e.g., a constant of "150") which then effectively opens or closes (i.e., changes yaw angle) the launch angle of the virtual golf ball 337. Additionally, the previously derived $\chi$ axis length measurement can be optionally multiplied by a second constant derived from real world testing (e.g., a constant of "50") which is then added as a force to the pitch launch angle of the virtual golf ball 337. The filtered 332 RW object golf club head velocity and quaternion at the point of interpolated Collider Detection 344 also contributes to the virtual golf ball's calculated trajectory. Finally, the launch angle force vector applied to the virtual golf ball is also adjusted to reflect the RW object golf club type 343 (e.g., driver, 7 iron, 9 iron).

When the RW object golf club head "hits" the virtual ball the overall club path is captured and the Vector3 quaternion is converted to a direction vector on the $\chi/\xi$ plane 340. The difference between the calculated direction vector 340 and the angle of the RW object golf club head impact with the virtual golf ball is then divided by another constant derived from real world testing (e.g., a constant of "25") and secondarily divided by the force vector of how hard the virtual golf ball was hit 339 thereby applying a force to the side of the virtual golf ball (i.e., draw or fade). This force is then applied typically 0.5 seconds after the virtual "hit" and terminated one second later thereby simulating the Magnus effect 339—i.e., the path of a spinning object (e.g., virtual golf ball) influenced by the difference in pressure of the air on opposite sides of the spinning object.

As a natural part of a golf swing the user typically alters their head orientation to look at where the "hit" (virtual) ball is going to land 341 this action triggers the transition for the stereoscopic AR/VR goggles from AR assisted video pass-through to immersion in a VR environment 342 (typically at 100% opacity), which is continued 342' on FIG. 3C. The immersive VR environment thereby providing an indication of where the virtual golf ball would have landed on a real world course.

FIG. 3C illustrates a more detailed swim lane block diagram representative example 350 of the specific embodiment of the system associated with the VR portion of generating and maintaining the mixed reality simulation environment of FIGS. 3A and 3B. While it should be appreciated that the overall swim lane block diagram of FIG. 3C is compatible with the exemplary embodiments of FIGS. 3A and 3B, the same general concepts are also applicable to other embodiments of mixed reality simulation environments.

As illustrated in the swim lane flowchart 350 of FIG. 3C, this detailed specific embodiment of the VR portion of this invention is conceptually divided into two groups (i.e., Object 351, and Human User 352) by the two "swim lane" columns as shown in the figure. As before, if a particular flowchart function appears completely within a swim lane, its functionality is limited to the data category of the associated swim lane.

The VR process 350 begins 342', continuing from the AR portion 342 of FIG. 3B, with the transition to the VR environment 353 (FIG. 3C) which derives its 3D virtual artifice of the RW object as well as its 3D simulated VR environment from the same Overlay & Artifice Database 306 that was utilized by the AR portion of this embodiment. The simulated Virtual Environment 353 being dynamically maintained with the associated VR artifice (extracted from the database 0306) moving in a similar manner to its associated RW object throughout the VR simulation since the optical and IMU tracking 354 of the RW object persists throughout the VR simulation. The resulting dynamic VR artifice essentially being presented as an overlay superimposed over the VR simulation background 355.

The VR simulation continues monitoring both the user's actions 356 as well as the RW object 355 so long as the user remains in a predefined orientation that is harmonious with the mixed reality VR environment. When the user changes their orientation to trigger a transition to AR 357 (e.g., head position looking downward, moves outside of a designated area), the RW view is presented via video passthrough with optional AR overlays 358.

Figure 3D:
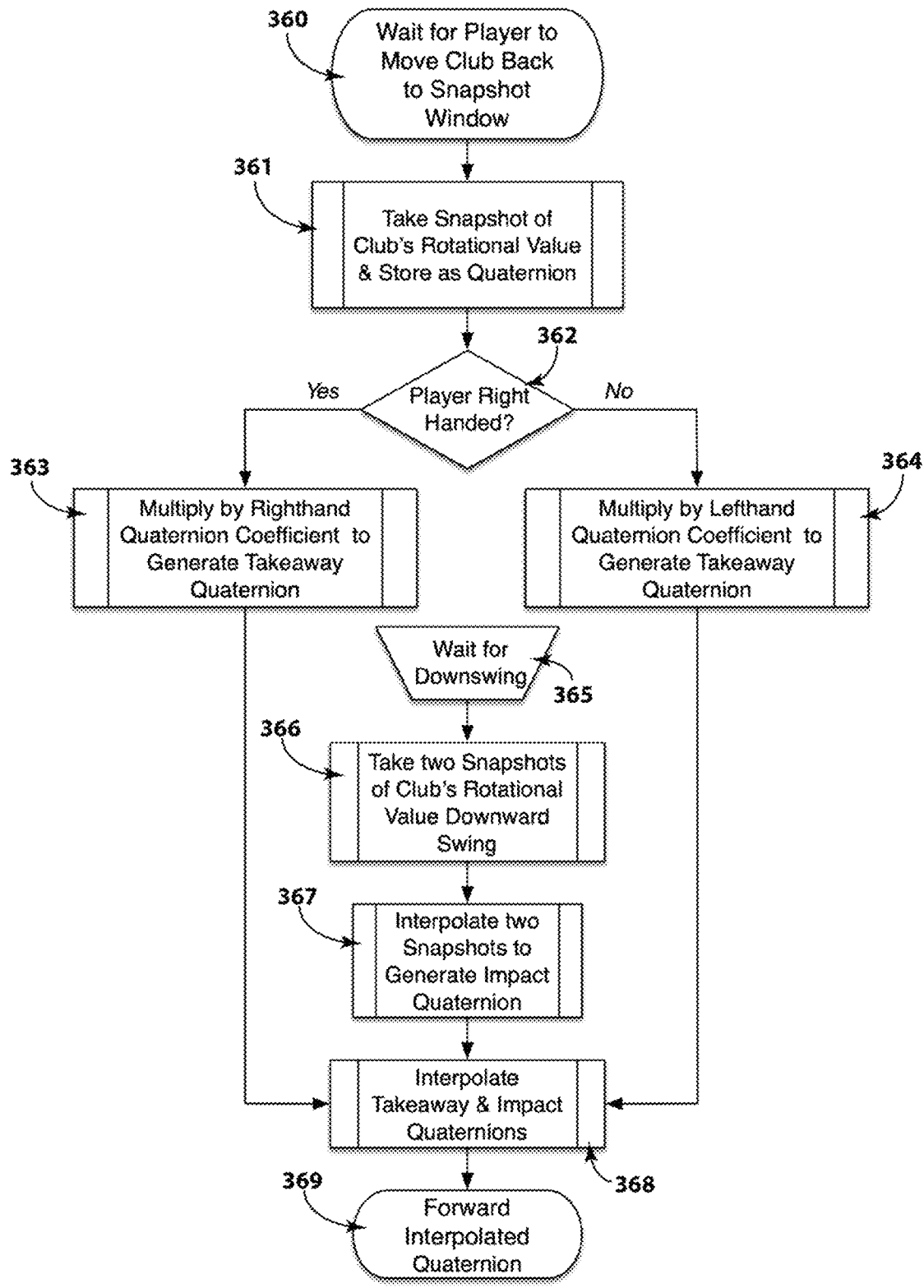
FIG. 3D is a block diagram representative example providing a detailed schematic graphical overview of the takeaway and swing portions interpolation of the specific embodiment of callouts 333 through 340 of FIG. 3B associated with tracking a real world object in AR.

While the previous disclosures provide exemplary overviews of a mixed AR and VR environment tracking the motion of a RW object, the idealized previous disclosures do not necessarily compensate completely for AR and VR hardware limitations that are inherent when attempting to track a rapidly moving and/or accelerating RW object such as a golf club, tennis racket, or a baseball bat. FIG. 3D provides an overview of an exemplary optional embodiment that could potentially compensate for these types of hardware limitations while at the same time remaining compatible with existing off-the-shelf AR and VR hardware (e.g., Apple iPhones®, Android® phones, Oculus). For example, subtle variances in fast RW golf swings tracked by an Oculus AR/VR device can result in a "pull" or "push" (shorter or longer ball flight path) of as much as ten yards when viewing the virtual ball's flight in VR due to inherent hardware limitations of the device with the same variances to the RW golf swing resulting in only a three yard pull or push in the real world. The exemplary optional embodiment of FIG. 3D discloses one possible method and system for resolving this virtual reality deviation from real world results. The optional embodiment of FIG. 3D essentially providing additional tracking and filtering processes to the Frame Analysis 333 through Quaternion Filtering 340 steps of FIG. 3B by monitoring the RW object during its back-swing or "takeaway" motion, which is typically slower moving (and consequently easier to track) than the corresponding forward motion of the same RW object.

The optional embodiment of FIG. 3D begins with the system waiting for the user to begin his or her backswing 360. When the user starts their backswing and the RW golf clubhead travels to a predefined window that is an a priori distance (e.g., 9 cm or ≈3.54 inches) from the RW golf club's initial address position (i.e., behind the virtual golf ball) a snapshot of the three-dimensional rotational values of the RW clubhead are captured and stored as a quaternion 361. Optionally, depending on whether the user is right or left handed 362, a "takeaway" quaternion is generated by multiplying the initially garnered backswing quaternion 361 by a right 363 or left 364 hand offset coefficient (e.g., X=15, Y=355, Z=350 for a right handed user 363 or X=15, Y=7, Z=7 fora left handed user 364). The offset coefficient (363 and 364) multiplication essentially projects the rotation of the RW clubhead to the future point of virtual impact from the rotational values garnered at the predefined window when the initial quaternion 361 was generated to the rotation of the RW clubhead when it first moved backward from its initial address position. The resultant "takeaway" quaternion is then stored to be utilized for future interpolation when the RW clubhead impacts the virtual golf ball, thereby calibrating the VR ball flight to more closely emulate RW ball flight.

At this point, the optional embodiment waits for the user to begin a downward swing 365. As the downward swing begins and the RW golf club approaches and "hits" the virtual ball, two snapshots of the RW clubhead's rotational positions 366 are taken and saved as quaternions as the RW clubhead passes through two predefined windows. The first window is a position just before the RW clubhead "hits" the virtual ball with the second window positioned shortly after the ball is hit.

The two garnered downswing quaternions are then interpolated to determine the RW clubheads rotational characteristics at the moment it "hits" the virtual ball 367. The weighting of the interpolation (i.e., the ratio between the prior to "hit" and the after "hit" quaternions) is determined by how far the two snapshots were taken from the virtual ball with the closer snapshot receiving more weight on a proportional basis. The resulting interpolation calculation producing a single "impact" quaternion 367.

Finally, the resultant impact quaternion is interpolated with the previously derived takeaway quaternion 368 to correct for the "noisy" tracking and correlation due to the limitations of the off-the-shelf AR and VR hardware again with a weighted ratio (e.g., 0.6 or 60% favoring the takeaway quaternion). The resultant interpolated quaternion 369 is then applied to the filters and Vector3 quaternion to produce a virtual ball trajectory that more accurately simulates real world behavior.

Of course, as is apparent to one skilled in the art while the previously disclosed optional embodiment concerns a RW golf club and virtual golf ball, this general technique of utilizing a backswing as additional data to further calibrate the forward swing can be applied to other RW objects. For example, a pickleball paddle or a tennis racket both typically experience similar backswing to forward swing interdependencies that the optional disclosed system and method may provide better correlation with RW ball motion when the limitations of off-the-shelf hardware AR and VR tracking devices are considered.

Figure 3E:
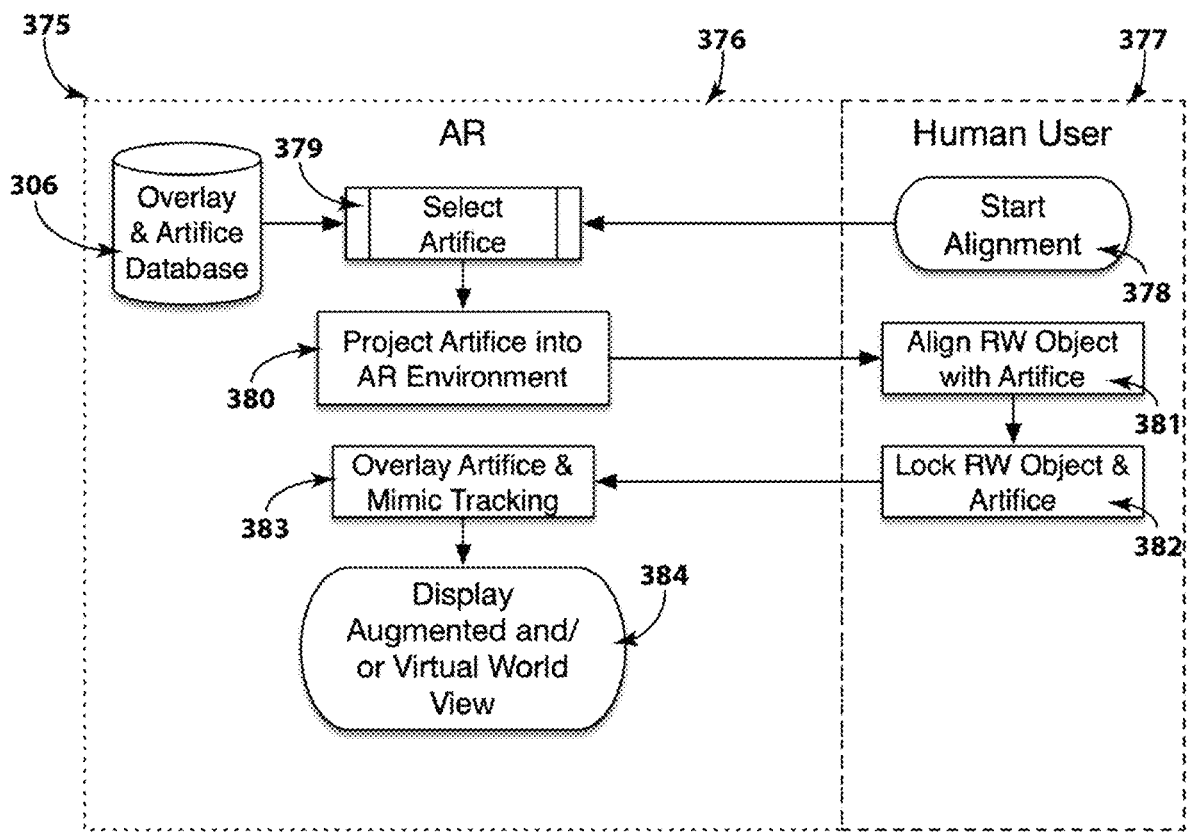
FIG. 3E is a swim lane block diagram representative example providing a detailed schematic graphical overview of aligning a real world object with its corresponding virtual artifice that is compatible with FIG. 3F.
Figure 3F:
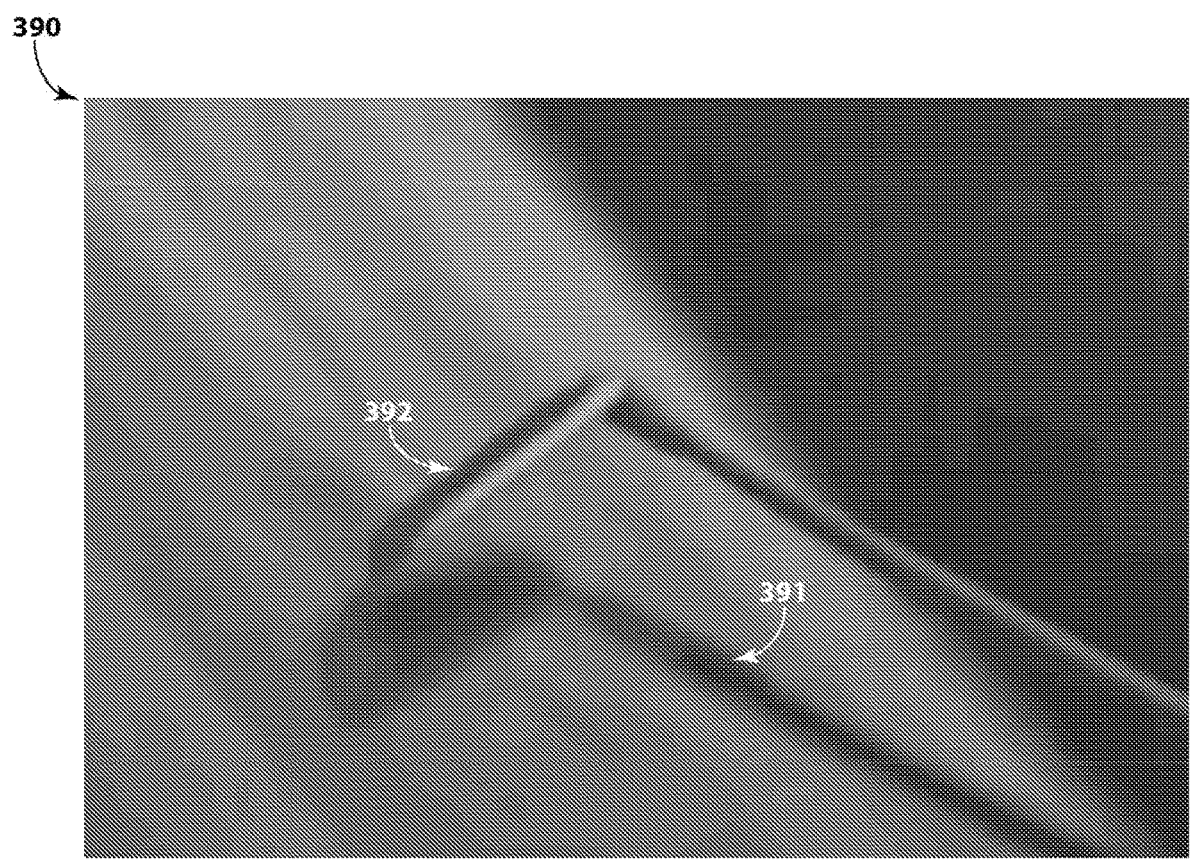
FIG. 3F is a representative example isometric view of the AR process of aligning a real world object with its corresponding virtual artifice.

With all of the previously disclosed embodiments, a RW object is seamlessly synchronized with its virtual artifice counterpart such that the RW object and its associated virtual artifice move through both real and virtual space in a similar manner. This synchronization typically requires that the virtual artifice and RW object be aligned through a separate process (e.g., callout 325 of FIG. 3B) prior to operation in the AR/VR mixed reality environment. FIGS. 3E and 3F taken together, illustrate one exemplary embodiment of this invention for synchronizing or aligning the movement of the RW object with its associated virtual artifice within the mixed reality environment. FIG. 3E provides an exemplary swim lane flowchart overview of the synchronization process with FIG. 3F providing an illustration of the AR synchronization process as viewed by a human user in progress.

The swim lane block diagram representative example 375 of FIG. 3E illustrates the interaction between the human user 377 and the AR portion of the system 376 when synchronizing the RW object with its virtual artifice. While it should be appreciated that the overall swim lane block diagram of FIG. 3E is compatible with the exemplary embodiments of FIGS. 3A thru 3D, the same general concepts are also applicable to other embodiments of mixed reality simulation environments.

As illustrated in the swim lane flowchart 375 of FIG. 3E, the synchronization process is conceptually divided into two groups (i.e., AR 376 and Human User 377) by the two "swim lane" columns as shown in the figure. As before, if a particular flowchart function appears completely within a swim lane, its functionality is limited to the data category of the associated swim lane.

FIG. 3E begins with the Human User 377 initiating the alignment or synchronization process 378, typically by actuating a virtual button in AR or VR mode. Once the alignment or synchronization process 378 has begun, the mixed reality headset switches to or remains in AR mode 376 with passthrough images of the immediate RW environment displayed to the Human User 377. A virtual artifice mimicking the user's RW object is then copied from the Overlay & Artifice Database 306 and projected 380 into the AR user's view. With some embodiments, the selection of an a priori artifice 379 will be hardcoded into the alignment or synchronization process (e.g., tennis or pickle ball racket, baseball bat) independent of the Human User 377. However, in other optional embodiments that allow the user to select from a variety of different RW objects (e.g., golf club driver, golf club seven iron, golf club putter), a plurality of various artifice selection buttons will first be displayed to the user to enable selection 379 of the artifice corresponding with the RW object.

Once the artifice selection process 379 has been completed and the artifice is projected into the AR environment 380, the Human User 377 will see both the virtual artifice and the RW object in their field of view. For example, FIG. 3F illustrates 390 a RW golf club 391 displayed in see through mode at the same time the selected virtual artifice 392 is also displayed as an AR overlay. At this point the Human User 377 (FIG. 3E) optionally commands (e.g., voice command, toggling a physical switch on a controller) the virtual artifice to remain stationary in three-dimensional AR space while he or she physically positions the RW object to occupy the same perceived space and angle as the virtual artifice 381. When the RW object and the virtual artifice appear to occupy the same mixed reality space 381, the RW object and associated artifice are locked together 382 by a command from the Human User 377 (e.g., voice command, virtual button, physical toggle switch on a controller), thereby aligning and synchronizing the RW object and the virtual artifice within the mixed reality system. From this point on, the virtual artifice will mimic the motions of the real world object 383 in both AR and VR displays so long as the simulation persists 384.

Figure 4A:
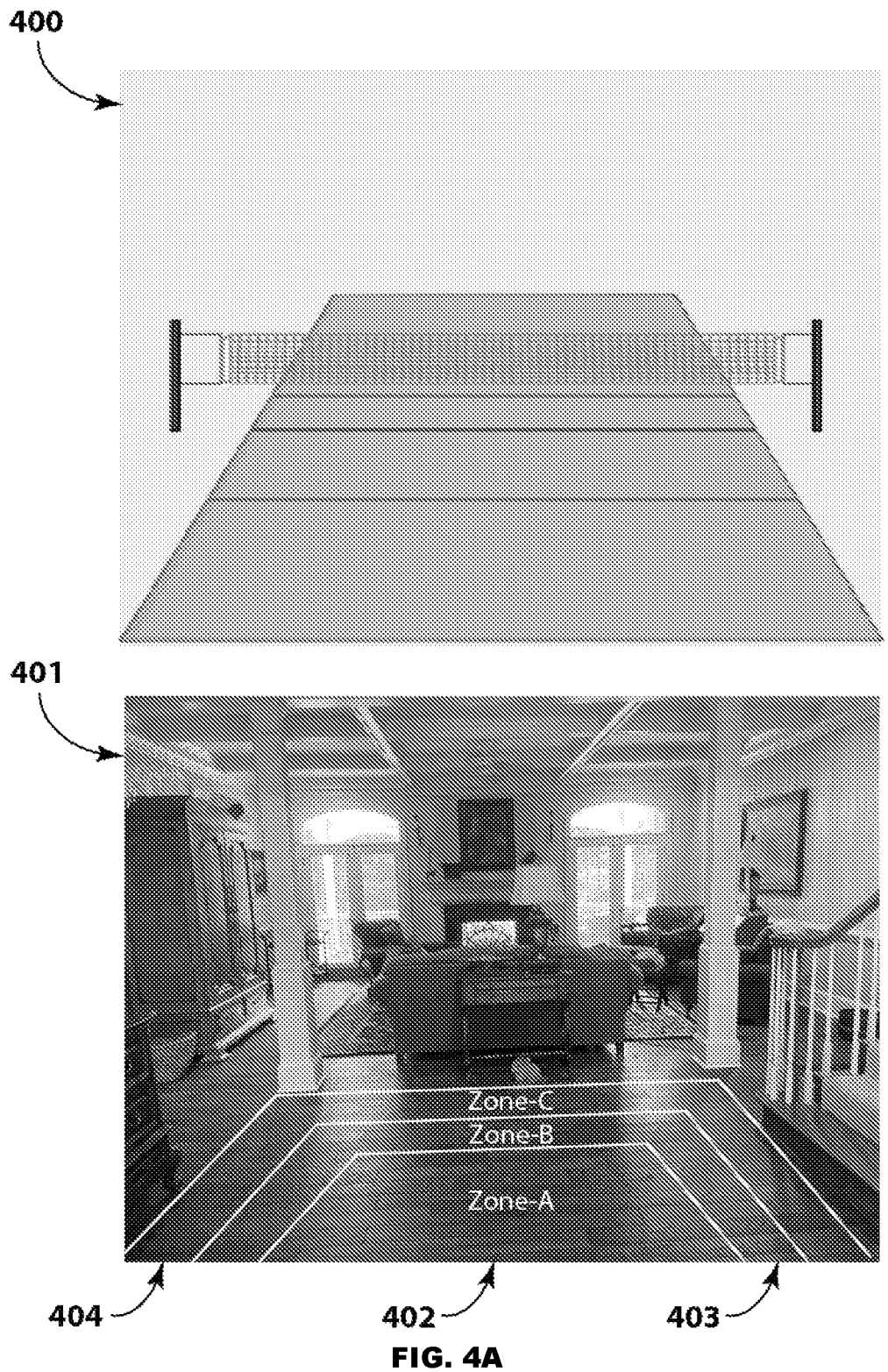
FIG. 4A is a representative example isometric view of a virtual volleyball court simulation and the associated real world environment where the virtual volleyball court simulation VR session will be conducted.

FIG. 4A provides exemplary illustrations of a virtual volleyball court 400 as well as the RW space 401 where the virtual volleyball court 400 simulation will occur. As is also illustrated in FIG. 4A, the RW space 401 is subdivided into three separate Zones "A," "B," and "C" (402, 403, and 404 respectively).

FIGS. 4B thru 4E taken together, illustrate a general embodiment of this invention providing a mixed reality simulation session of a volleyball game where the VR volleyball simulation gradually dissolves from 100% opacity to more transparent values progressively revealing the surrounding RW environment as the human user moves within the RW space. FIGS. 4B thru 4E are arranged with the human user gradually moving from the center of the VR volleyball court (402 or "Zone A" of FIG. 4A) to its periphery with the corresponding opacity of the VR volleyball simulation gradually dissolving as the human user moves from the VR volleyball's court center.

Figure 4B:
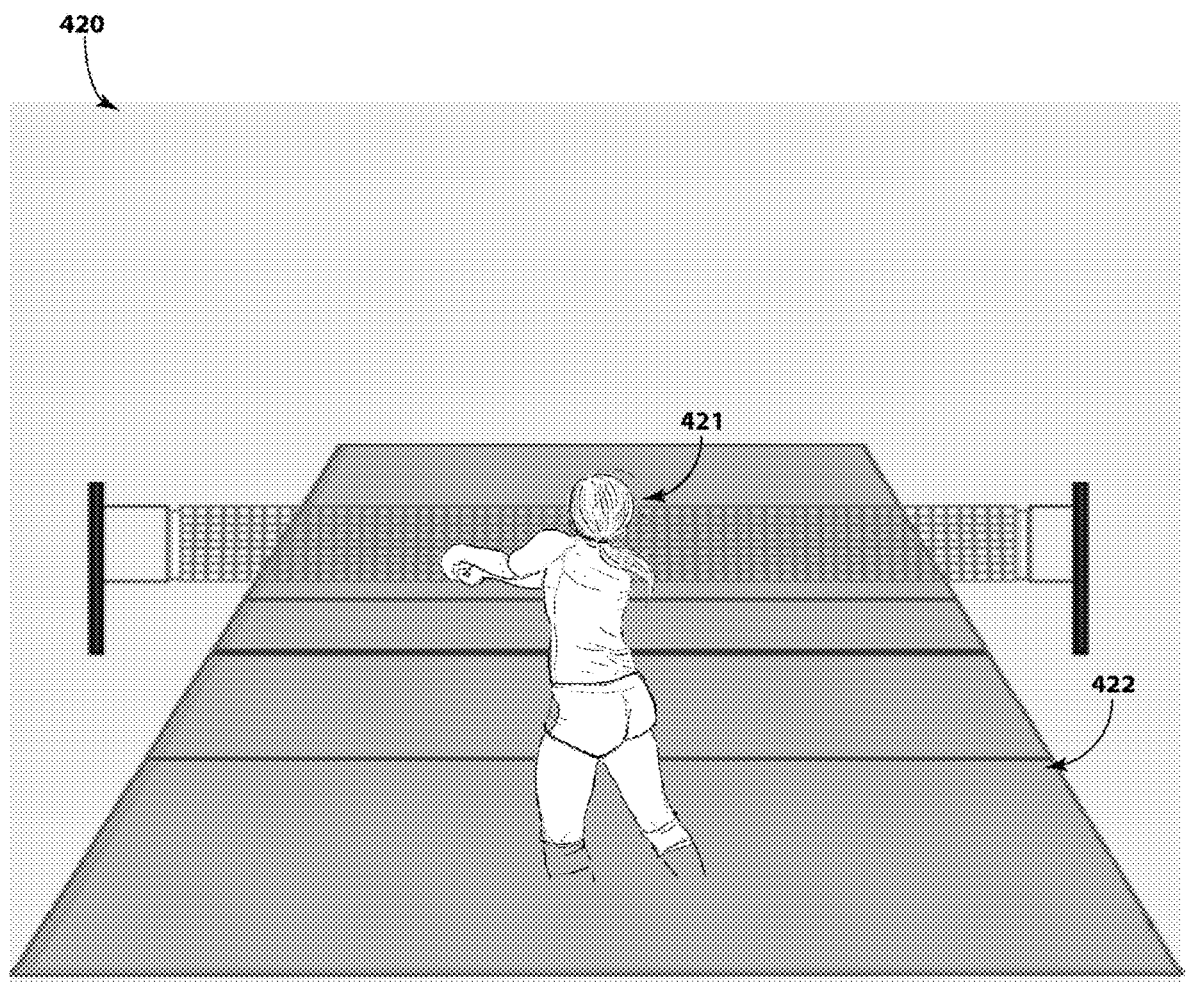
FIG. 4B is a representative example isometric view of the virtual volleyball court simulation of FIG. 4A viewed with 100% opacity.
Figure 4C:
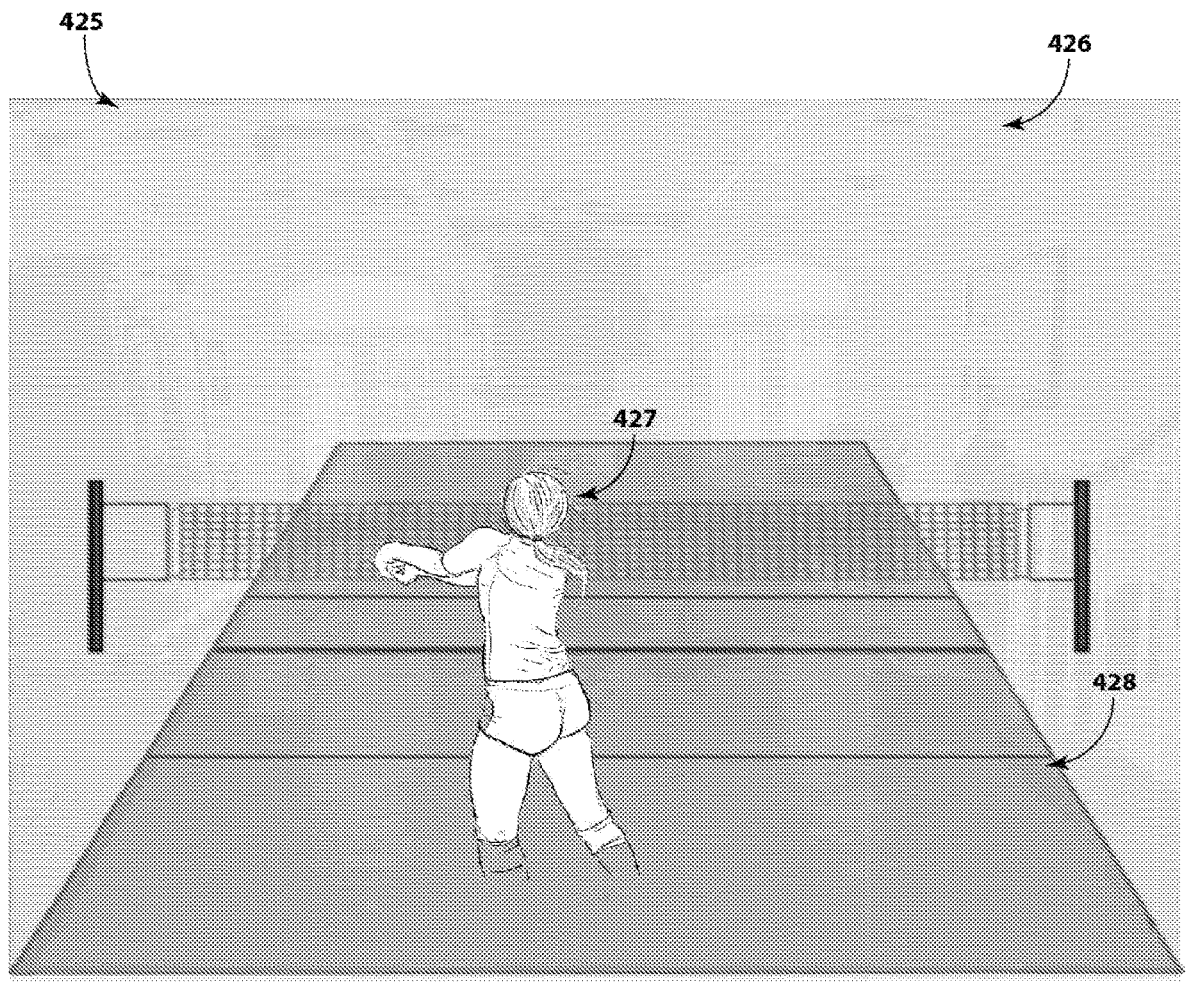
FIG. 4C is a representative example isometric view of the virtual volleyball court simulation of FIG. 4A viewed with 90% opacity.

Starting with 420 of FIG. 4B, the VR volleyball court 422 is displayed at 100% opacity since the human user 421 is positioned in the center of the VR volleyball court and consequently in Zone A 402 (FIG. 4A) which is the farthest from any physical fixed obstacle in the surrounding RW space. In 425 of FIG. 4C, the human user 421 has moved slightly to her left and has begun to step into Zone B (403 of FIG. 4A) resulting in the perceived opacity of the VR volleyball court 428 (FIG. 4C) being reduced to 90% causing a slight background appearance 426 of the surrounding RW space which is typically enough to start to make the human user become aware of the surrounding RW space without becoming too obtrusive in the ongoing VR simulation.

Figure 4D:
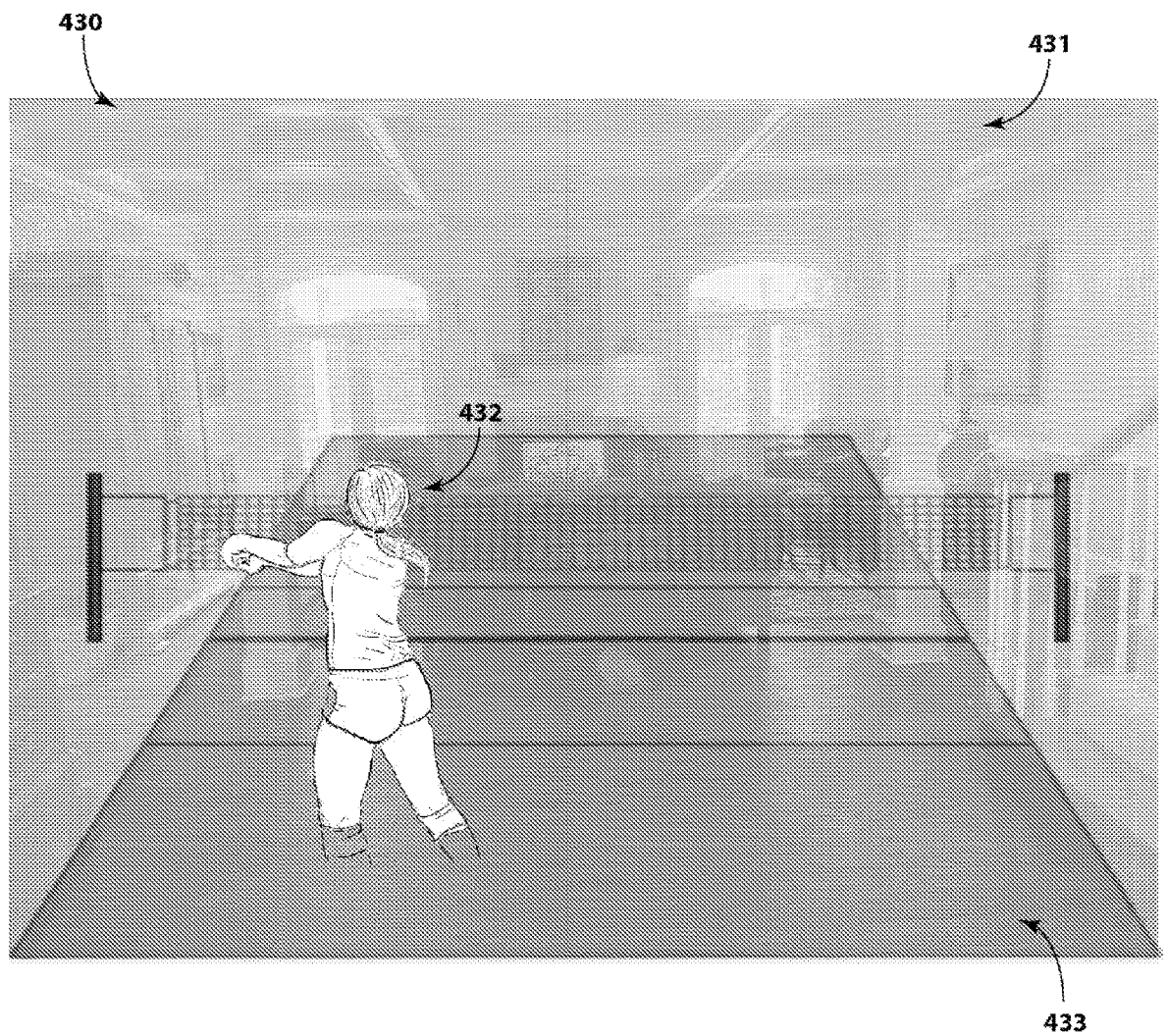
FIG. 4D is a representative example isometric view of the virtual volleyball court simulation of FIG. 4A viewed with 50% opacity.
Figure 4E:
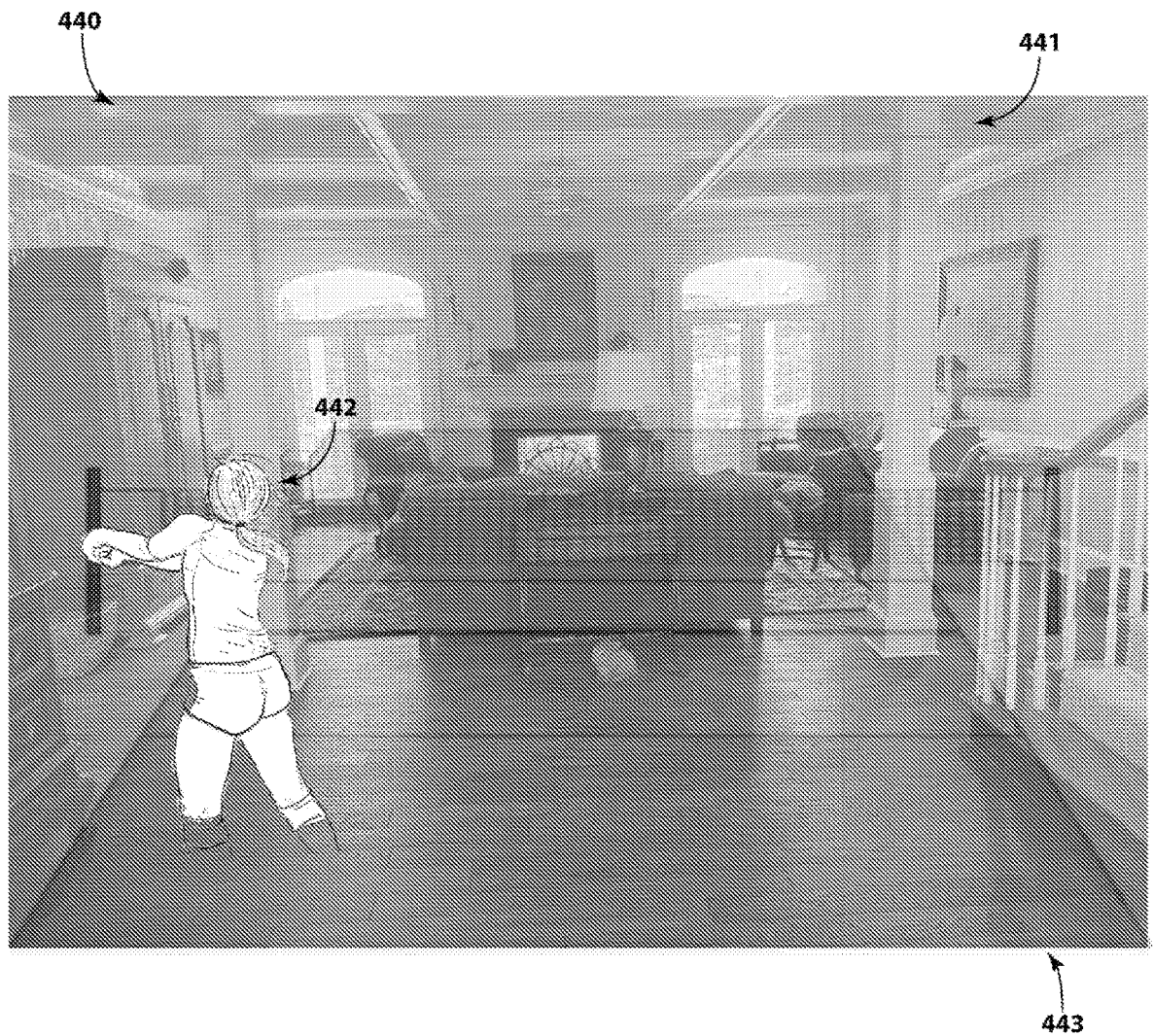
FIG. 4E is a representative example isometric view of the virtual volleyball court simulation of FIG. 4A viewed with 10% opacity.

With 430 of FIG. 4D the human user 432 has moved further to her left such that she is now bordering Zones B and C (403 and 404 respectively of FIG. 4A) resulting in the perceived opacity of the VR volleyball court 433 (FIG. 4D) being further reduced to 70% resulting in a more dominate background appearance 431 of the surrounding RW space still allowing the human user to participate in the ongoing VR volleyball simulation while at the same time alerting the user to become acutely aware of the surrounding RW space. Finally, 440 of FIG. 4E shows the human user 442 on the outside of Zone C (404 of FIG. 4A) and consequently near real world objects so the opacity of the VR volleyball simulation 443 has been reduced to 40% with the surrounding RW space readily apparent for safety.

Thus, with the innovations of this disclosure the opacity of the VR simulation varies depending on the human user's position within their surrounding RW environment. By utilizing gradual video dissolve instead of an abrupt change from VR to video passthrough as is known in the prior art the user becomes progressively aware of the surrounding RW environment as the need for safety requires. This progressive awareness of the surrounding RW environment as the opacity of the VR simulation dissolves tends to be less disorienting to the user while allowing the user to alter course and maintain the VR simulation if they desire.

Of course, as is apparent to one skilled in the art in view of this disclosure there may be different methodologies that under some circumstances can be more advantageous. For example, the opacity of the VR simulation could dissolve on a linear basis as the user moves from the center of the designated safe area. Alternatively, the opacity of the VR simulation can be programmed to dissolve to an intermediate opacity (e.g., 50%) that still enables VR simulation interaction if the cameras embedded in the stereoscopic AR/VR goggles detect that another human or animal has moved into the immediate vicinity of the user interacting with the VR simulation even if the user remains in a designated safe area. Etc.

Figure 5A:
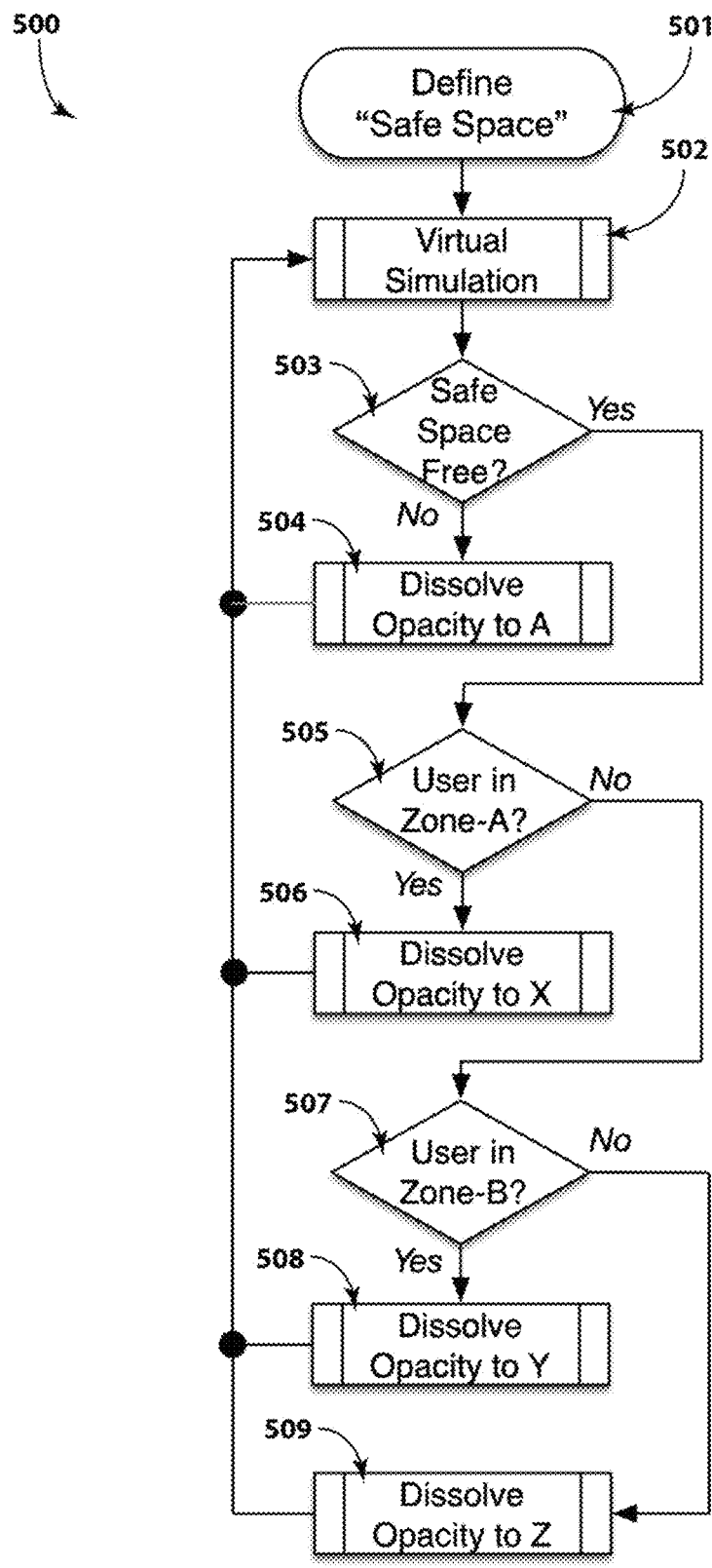
FIG. 5A is a block diagram representative example providing a schematic graphical overview of the embodiment of the system of FIGS. 4B thru 4E.
Figure 5B:
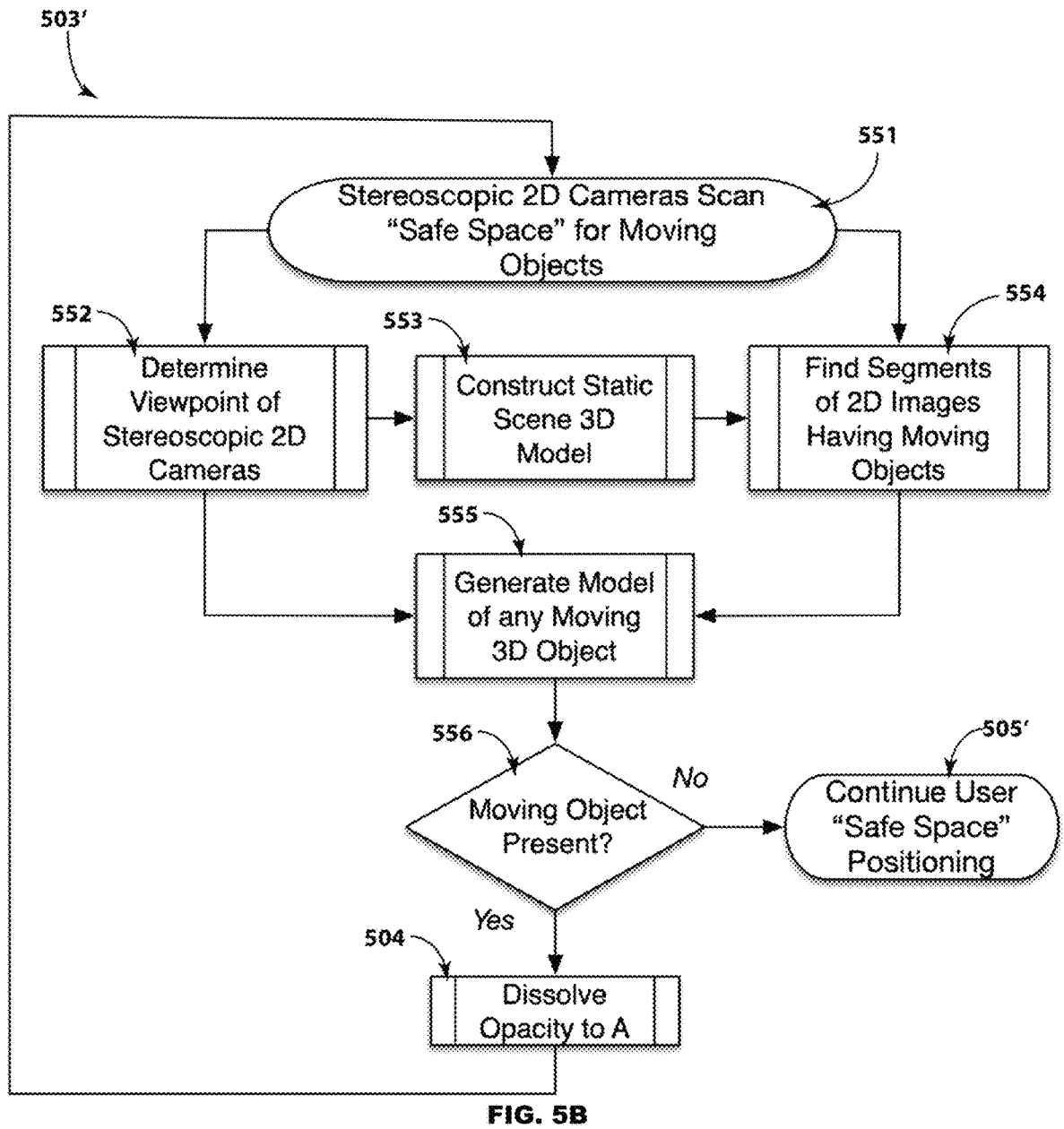
FIG. 5B is a block diagram representative example providing a more detailed schematic graphical overview of a function within the embodiment of FIG. 5A.

FIGS. 5A and 5B taken together, illustrate one possible embodiment of the system associated with generating the video dissolve mixed reality simulation environment of FIGS. 4A thru 4E. FIG. 5A provides an overview of the overall flow of the mixed reality simulation of FIGS. 4A thru 4E showing how dissolve transitions from exclusively VR mode to a mixed VR and RW view of the surrounding environment are actuated. FIG. 5B provides a more detailed description of the dissolve transition from exclusively VR mode to a mixed VR and RW view when a moving object (e.g., human, animal) breaches the established VR safe space while the user is engaged in VR mode at or near 100% opacity.

FIG. 5A illustrates a block diagram flowchart representative example 500 of one possible embodiment of the system associated with generating the video dissolve mixed reality simulation environment of FIGS. 4A thru 4E. While it should be appreciated that the block diagram flowchart 500 of FIG. 5A is compatible with the exemplary embodiment of FIGS. 4A thru 4E, the same general concepts are also applicable to other embodiments of mixed reality simulation environments. However, it should also be understood, that while the exemplary embodiments of FIGS. 4A thru 4E utilized three different Zones to define the safe spaces there are other methods of defining safe spaces (e.g., linear dissolve of VR simulation opacity as the user moves away from a central point) that may be more desirable depending on the simulation type and the surrounding RW environment.

FIG. 5A begins with the user defining a "Safe Space" within their surrounding RW environment 501 where they can move about freely with 100% VR or similar simulation opacity viewing without the fear of hitting or bumping into any RW object. Once the safe space is defined 501 the Virtual Simulation 502 begins typically with the VR simulated environment's opacity set to 100%. Throughout the VR simulation the system constantly monitors the stereoscopic cameras 202 embedded in the AR/VR video device 201 (FIG. 2A) to scan the immediate area for any moving objects (e.g., human, animal) that breaches the established VR safe space while the user is engaged in VR mode with 100% (or similar) opacity 503 (FIG. 5A). If the safe space remains free of moving objects 503 the system proceeds to determine the user's location relative to the defined safe space(s). However, if a moving object is detected that breaches the established VR safe space 503, the system will dissolve the opacity of the VR simulation that the user is seeing to a mixture of VR and the surrounding RW environment 504 that is sufficient for the user to both continue to interact with the simulation while at the same time becoming aware of the nearby moving object (e.g., 50% opacity). It should be noted that the system monitors for a moving object breach when the system is in VR mode while no video passthrough is visible to the user.

With this example, while the VR simulation is ongoing and assuming a moving object breach is not detected 503, the system continuously verifies that the user is within Zone A 505 (i.e., center of safe zone) and if so, maintains the VR simulation at or near 100% opacity 506. If the human user leaves Zone A 505, the system then determines whether the human user has physically moved to Zone B 507 (i.e., still in safe zone, but not in the center) and of so reduces the VR simulation's opacity to a lower level 508 (e.g., 70%). However, in example 500 if the human user is not found in either Zones A or B the system further reduces the VR simulation's opacity 509 to a level where the RW environment is readily apparent to the human user (e.g., 10% opacity, 0% opacity). Optionally, the system may elect to pause the VR simulation when the opacity has been reduced to this level.

Of course, as is apparent to one skilled in the art there are other methodologies for providing VR opacity dissolve transitions that may under some circumstances be more desirable. For example, a transition from VR to a mixed VR and RW environment may be initiated only if the VR simulation opacity is initially above a predetermined threshold value (e.g., 75%).

FIG. 5B provides a more detailed description 503' of the dissolve transition functionality when a moving object is detected to breach the established VR safe space of the mixed reality simulation. The dissolve transition functionality detailed description 503' continuously monitors the mixed reality simulation's safe space within the surrounding RW environment for a breach by a RW moving object 551.

There are multiple known systems and methodologies for detecting movement of 3D objects in the real world using a plurality of two-dimensional (2D) cameras that may also be moving—e.g., U.S. Patent Application Publication No. 2013/0208948 (Berkovich et al.), which is incorporated by reference herein. Most operate by first determining the RW viewpoint or perspective of the various 2D cameras 552 and using the cameras viewpoints combined with the acquired visual data feeds to construct a static 3D model 553 of the scanned RW environment. This developed static 3D model 553 is then compared to the live 2D camera feeds to find segments of 2D images that change relative to the static 3D model 554. The resulting detected segments can then be stitched together to generate models of any 3D moving objects 555.

If moving objects are detected 556, the mixed reality simulation system will dissolve the opacity of the VR simulation that the user is seeing to a mixture of VR and the surrounding RW environment 504 that is sufficient for the user to both continue to interact with the simulation while at the same time becoming aware of the nearby moving object (e.g., 50% opacity). Otherwise, the mixed reality simulation system will continue to determine the user's position relative to the safe space 505' and respond accordingly.

Figure 6A:
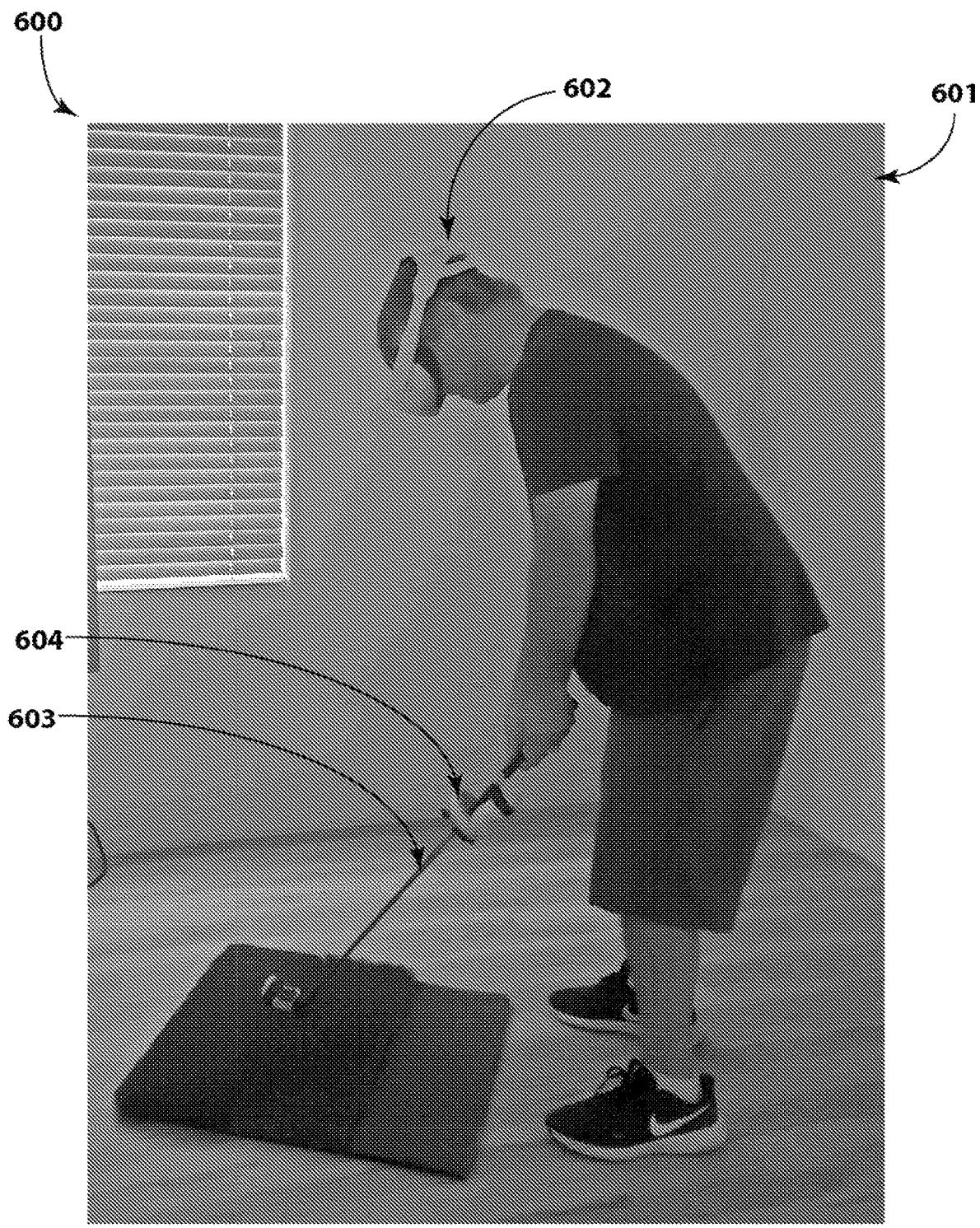
FIG. 6A is a representative example isometric view of a user of in the context of his real world environment.
Figure 6B:
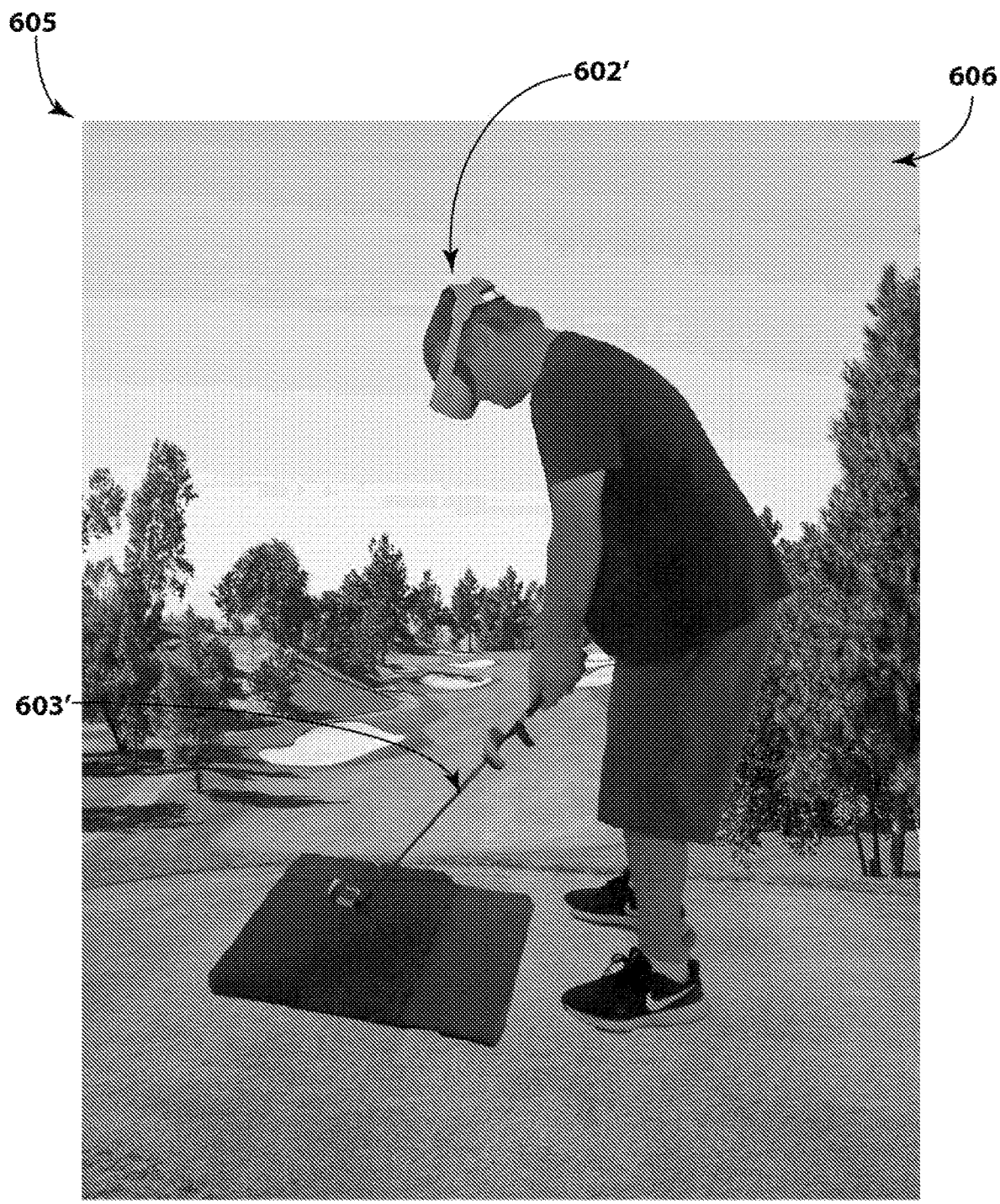
FIG. 6B is a representative example isometric view of the user of FIG. 6A in the context of a mixed reality environment.
Figure 6C:
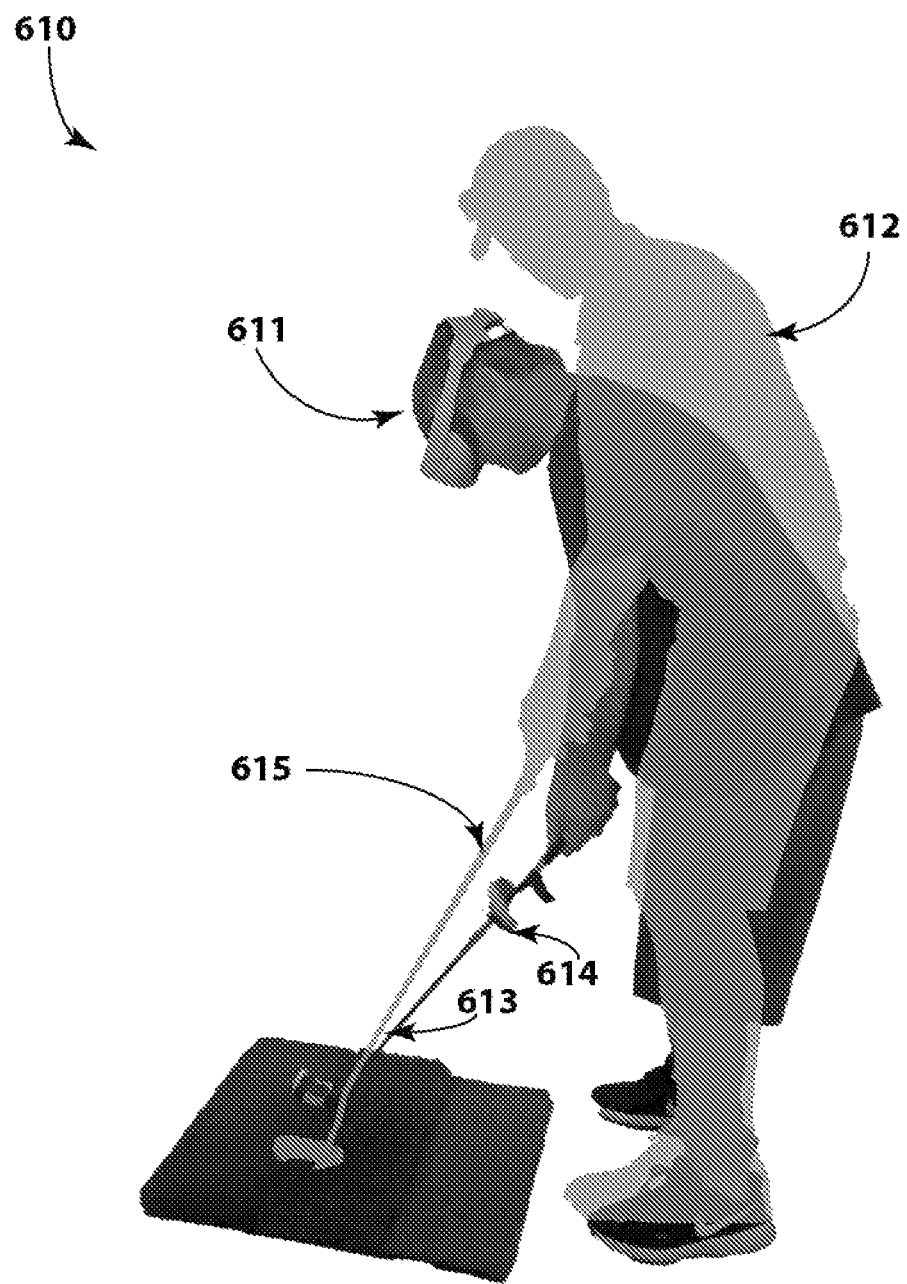
FIG. 6C is a representative example isometric view of the user of FIG. 6A comingled with the virtual embodiment of a human instructor.

FIGS. 6A thru 6C taken together, illustrate another general embodiment of this invention providing a mixed reality simulation session of a first user interacting with the simulated environment such that a second user can observe the first user either recorded or in real time. This general embodiment being particularly useful for applications where the second user is an instructor or coach where the instructor or coach can observe the dynamics and full body motion of the first user and their interactions with the simulated environment rather than just the simulated environment or the first real world human in isolation. This holistic perspective has the benefit of potentially granting insights to the instructor or coach on the first user's motions that might not have been apparent with isolated views.

Starting with 600 of FIG. 6A, the first user 602 is shown wearing a VR headset holding a Real World (RW) golf club 603 equipped with a clip-on device housing a VR tracker 604 (e.g., off-the-shelf Oculus left-hand controller). As illustrated in FIG. 6A, the human first user 602 is physically in a RW room 601, presumably in his house, with a camera on a tripod (not shown in FIG. 6A) producing a video feed of the first user and the surrounding RW environment. Preferably, the RW room background 601 component of the video feed is digitally removed using any one of the well known processes (e.g., U.S. Pat. No. 9,792,676) leaving only the first user 602 with a transparent background in the video feed.

The background filtered video feed 600 of FIG. 6A can then be overlayed with the simulated virtual environment resulting in a mixed reality video feed 605 (FIG. 6B) showing both the first user 602', any RW equipment 603', and the virtual simulated environment 606 that the first user perceives through his VR googles. Preferably, the perspective of the RW camera focused on the first user is aligned with an analogous perspective in the virtual simulated environment 606. Ideally, this alignment would include the height, pitch, roll, and yaw of the RW camera translated into the perspective of the virtual simulated environment 606. Again, the resulting mixed reality video feed 605 allows the second user instructor or coach to gain insights into the first user's motion and judgement that would not be possible with either a singular view of the first user or the simulated virtual environment.

Finally, FIG. 6C illustrates a specific alternative embodiment 610 where the first user 611 with his RW golf club 613 and attached tracking mechanism 614 coexist in the same virtual space in the simulated environment with the second user instructor or coach 612 along with a virtual rendition of the second user's golf club 615. By coexisting in the same virtual space in the simulated environment, the first user 611 (student) can literally see the exact stance and movement (e.g., golf swing) of the collocated second user instructor or coach (teacher) from his or her own perspective. This ability to see an instructor's or coach's motions from the student's own perspective (i.e., not observing the instructor or coach from a different perspective) is unique and in theory could not be replicated in any other media than AR and VR with the ability to project two different users into the same virtual environment and essentially enable the two users to occupy the same space at the same time from the same perspective. By maintaining its own virtual coordinate system, an AR or VR device can allow two separate users to in essence inhabit each other's space. This is an unique teaching tool, especially in sports like golf or tennis, that allows the first user (student) 611 to directly mimic the motions of the instructor or coach 612 from the first user's own perspective which heretofore was unknown in the art. Of course, the disclosed specific embodiment 610 of FIG. 6C is not necessarily limited to mixed reality environments, the same benefits could be realized in a pure VR simulated environment.

Figure 6D:
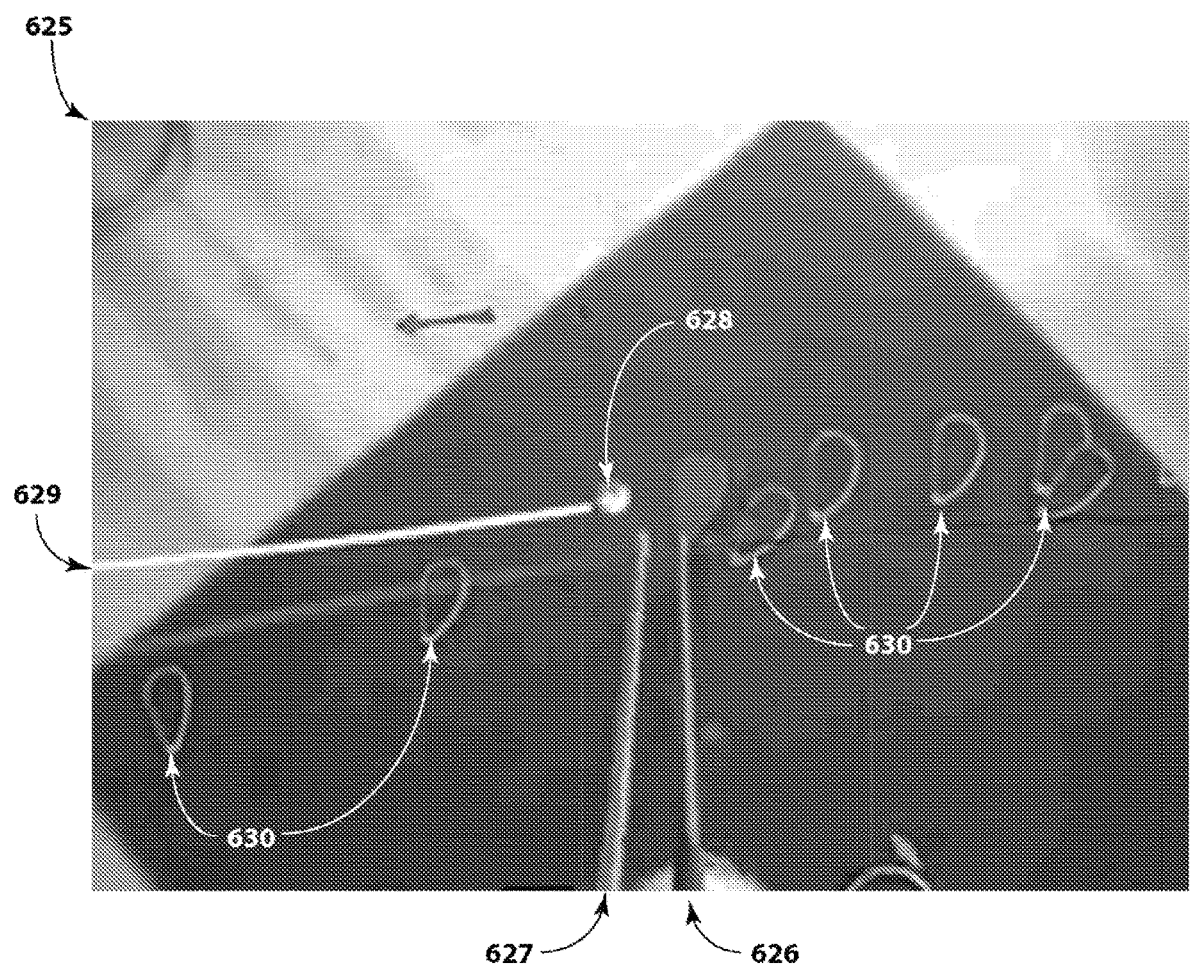
FIG. 6D is a representative example isometric view of a real world golf club and virtual ball with augmented reality strobed trails providing the user with an indication of his or her club swing path.

In addition to or instead of the mixed reality teaching enhancements as disclosed in FIGS. 6A thru 6C, FIG. 6D provides an AR or VR teaching enhancement 625 that allows the user to forensically analyze his or her own movements by recording the motions of the user and/or adjunct equipment with the stored motions later replayed in either the AR or VR environment. These replays of the user and/or adjunct equipment motions can appear as different strobed images 630 displaying various snapshots of motion through specific time periods (e.g., every 10 ms) of the adjunct equipment (e.g., golf club 626). In the example of FIG. 6D, the variance in the golf club face angle is apparent in the strobed images 630. Alternatively, tracer lines with optional tangent vectors indicating both the motion path as well as its magnitude (not shown in FIG. 6D). Additionally, a theoretical ideal placement 627 of the adjunct equipment (e.g., golf club 626) relative to a virtual object (e.g., golf ball 628) can also be shown with the resultant ideal trajectory 629.

Figure 7:
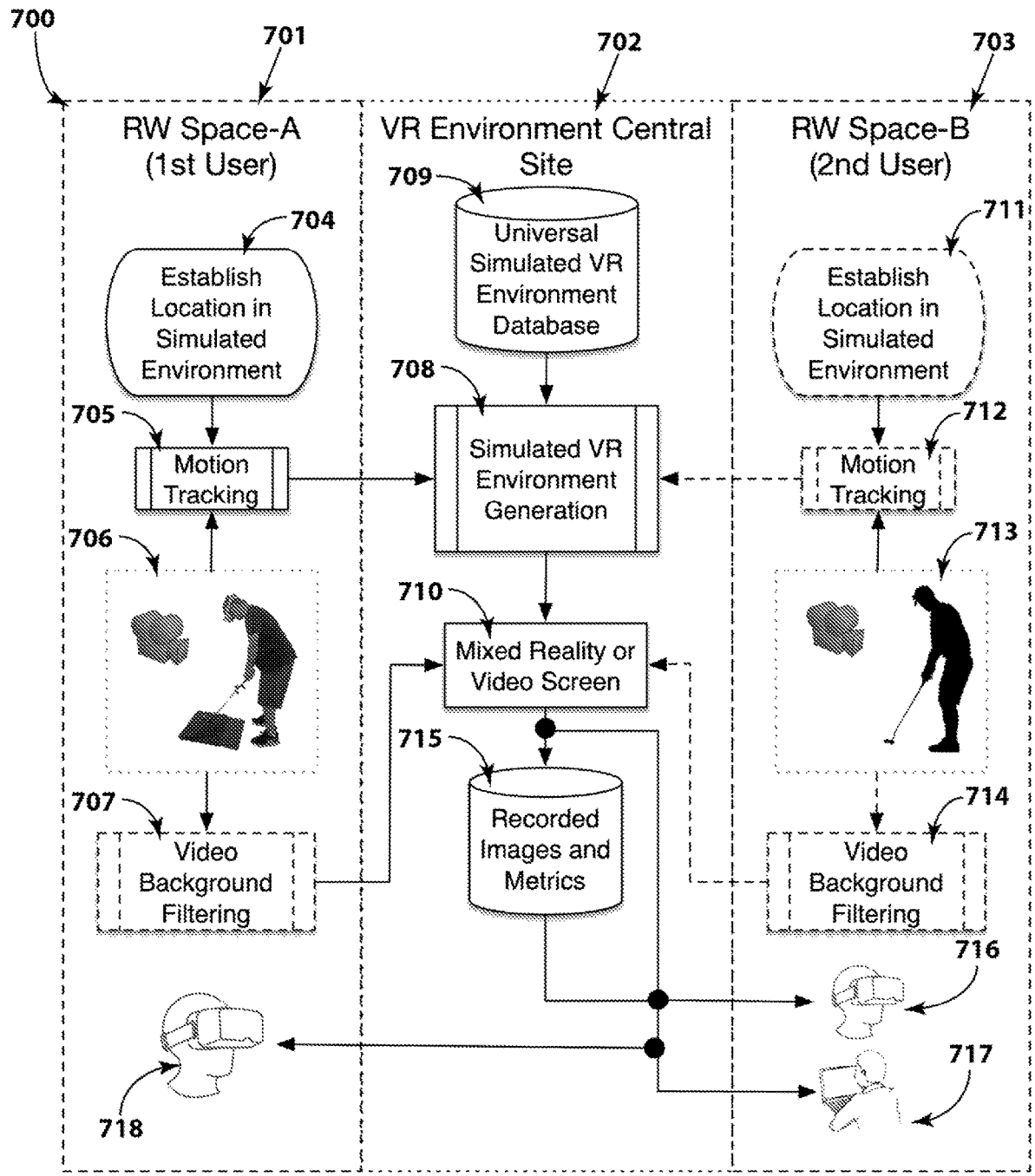
FIG. 7 is an overall swim lane block diagram representative example providing a schematic graphical overview of a general embodiment of a mixed reality simulation environment suitable for a second user observer or teacher.

FIG. 7 illustrates an overall swim lane block diagram representative example 700 of a specific embodiment of creating an interactive mixed reality environment with at least two users. While it should be appreciated that the overall swim lane block diagram of FIG. 7 is compatible with the exemplary embodiment of FIGS. 6A thru 6C, the same general concepts are also applicable to other embodiments of VR and mixed reality simulation environments.

As illustrated in the swim lane flowchart 700 of FIG. 7, this overall embodiment of the invention is conceptually divided into three groups (i.e., RW Space-A (1st User) 701, VR Environment Central Site 702, and RW Space-B (2nd User) 703 by the three "swim lane" columns as shown in the figure. If a particular flowchart function appears completely within a swim lane, its functionality is limited to the data category of the associated swim lane—e.g., Simulated VR Environment Generation 708 is exclusive to the VR Environment Central Site 702.

Swim lane high level architecture diagram 700 typically begins with the first user 701 focusing a RW camera on a tripod to a RW area where he or she will be performing an activity 706. Typically, before starting the VR simulation, the first user 701 will also define the location, orientation, and perspective of the RW camera 706 with respect to the simulated VR environment 704 such that the RW camera video feed will appear properly aligned within the simulated VR environment when operating in mixed reality mode. Once the RW camera is setup and running 706, a video feed of the first user interacting with the virtual environment will be transmitted to the VR Environment Central Site 702 for inclusion in the simulated VR environment 710, either as mixed reality where the first user is superimposed into the simulated VR environment (e.g., FIG. 6B) or as a floating video screen that can be positioned by the second user 703 (FIG. 7) anywhere within his or her field of view. Optionally and preferably, the background portion of the video feed surrounding the first user (e.g., 601 of FIG. 6A) can be digitally eliminated 707 (FIG. 7) by any one of the well-known processes (e.g., U.S. Pat. No. 9,792,676) leaving only the first user 602 (FIG. 6A) with a transparent background in the video feed, thereby enabling mixed reality processing. In addition to the video feed, the motions of the first user 701 (FIG. 7) and associated equipment are tracked 705 and transferred to the VR Environment Central Site 702 to manipulate the simulated VR environment 708.

At this point, the Simulated VR Environment Generation module 708 extracts and processes predefined images and data of the simulated VR environment from a database 709 for compiling 710 with the video feed from the first user 701 to create a mixed reality VR simulation causing the first user 701 to be superimposed over the simulated VR environment. The resultant mixed reality simulated VR environment is then transmitted to the second user's 703 VR headset 716 or two-dimensional display 717 so that the second user can observe the first user's 701 motions. Alternatively, the video feed of the first user 701 may appear in the second user's 703 VR headset 716 or two-dimensional display 717 as a floating video screen. Optionally, the mixed reality or added video screen simulated VR environment may be recorded 715 for later playback by the first 701 and/or second users 703.

Optionally, the second user 703 can interact with the first user 701 within the simulated VR environment either exclusively via Motion Tracking 712 of the second user's 703 body and associated equipment visually represented as an avatar or preferably by adding the second user's own video feed 713 and Motion Tracking 712 to the resultant mixed reality simulated VR environment 710. This optional addition of the second user 703 interacting with the mixed reality simulated VR environment greatly expands the teaching potential of the venue. As previously disclosed in the discussion of FIG. 6C, the unique aspects of VR allow the first 701 (FIG. 7) and second 703 users to coexist in the same virtual space in the simulated environment. By coexisting in the same virtual space in the simulated environment, the first user 701 (student) can literally see the exact stance and movement (e.g., golf swing) of the collocated second user 703 instructor or coach (teacher) from his or her own perspective. This ability to see an instructor's or coach's motions from the student's own perspective (i.e., not observing the instructor or coach from a different perspective) is unique and in theory could not be replicated in any other media than AR or VR with the ability to project two different users into the same virtual environment and essentially enable the two users to occupy the same space at the same time from the same perspective.

Of course, the video feed 713 of the second user 703 can also undergo background filtering 714 thereby enabling the second user 703 to actively be a presence in the mixed reality simulated VR environment. A mixed reality video feed 713 of the second user 703 or an avatar tracking the motions 712 of the second user 703 can also be seen recorded 715 or in real time by the first user 718.

Referring to the source code in the Appendix, the following explanation is provided regarding the parts of the source code which implement one preferred embodiment of an AR/VR switching algorithm implemented using an Oculus Quest 2 virtual reality headset developed by Facebook Reality Labs. The switching algorithm alters the user's view between two states (VR and AR). The VR state displays total emersion in the simulated environment with the Quest 2 passthrough cameras turned off. The other, AR state, is a combination of the users' real world environment (achieved using Quest 2 passthrough cameras) and virtual objects (e.g., template guide objects, virtual club, flag and green for aiming reference). The AR passthrough cameras are used to keep the user aware of his or her surroundings for safety and to have their real hands, feet, club, hitting surface, and optionally a real golf ball visible.

Switching between states is achieved by tracking two Booleans (bool) every frame and triggering events based on how they are toggled:

IsOverAndLookingCode: First bool switches based on the user's tracked headset being in/out of a volume of space (predefined invisible cube) that is placed above the feet holograms and is a functional child of the feet holograms. The cube's volume is predefined (0.7 m×0.5 m×2.5 m-≈2.3× 1.6×8.2 feet) and moves around with the template. The effect is that the bool is true when the user is in a "ball addressed" position. There is a 0.3 second delay when the user moves between states. This serves as a way to avoid a "flickering" effect between views when the user is on the border of the volume.

HeadUpCode: The second bool is toggled by the rotation of the user's headset within a certain range. If the player is looking straight down, the "headXRotation" bool is true. As the user looks up, moving their head about 65 degrees, the bool is switched to false. The head rotation is a float variable of the headsets forward.y, and can be adjusted by the user for added safety or immersion.

PassthroughSwitcher: If both bools are true, (head in position and looking up) the system maintains the VR state waiting for either of the bools to be switched to false. Upon switching states, the user's view is switched back to AR mode with the system waiting for both bools to be true.

Of course, as is apparent to one skilled in the art, there are other methodologies for detecting moving object breaches to designated safe zones that may under some circumstances be more desirable. For example, the surrounding RW environment may be scanned for infrared light emissions that change position relative to the RW background. Since most living things such as humans and warm-blooded animals have body temperatures, the detection of infrared emissions relative to the RW background environment may be particularly adventitious for determining if a moving object has breached the established safe zone of the simulation for most domestic households.

It should be appreciated by those skilled in the art in view of this description that various modifications and variations may be made present invention without departing from the scope and spirit of the present invention. It is intended that the present invention include such modifications and variations as come within the scope of the appended claims.

What is claimed is:

1. A method for providing mixed reality simulations with real time coordination of both Augmented Reality (AR) and Virtual Reality (VR) environments, the method including (i) collecting the dynamic real time metrics of at least one real world object, (ii) collecting the dynamic real time metrics of at least one human user, and (iii) displaying the mixed reality simulation to the at least one human user via stereoscopic AR/VR goggles, the method comprising:
    (a) receiving in real time from the at least one real world object:
        (i) motion and orientation metric data, and
        (ii) position metric data relative to the surrounding real world;
    (b) receiving in real time from the at least one human user:
        (i) motion metric data,
        (ii) position metric data relative to the surrounding real world, and
        (iii) orientation metric data;
    (c) creating a virtual artifice of the at least one real world object with the virtual artifice's motion and orientation metrics that are representative of the garnered real time metrics of the at least one real world object; and
    (d) monitoring the at least one human user's body position and configuring the stereoscopic AR/VR goggles to operate in either:
        (i) video passthrough mode with the at least one real world object being visible with AR assist when the user's body position is in a first configuration and transitioning the stereoscopic AR/VR goggles to operate in VR mode with the virtual artifice superimposed in the position and orientation of the at least one real world object into the virtual environment when the user's body position is in a second configuration, or
        (ii) VR mode with the virtual artifice superimposed into the virtual environment when the user's body position is in the second configuration and transitioning the stereoscopic AR/VR goggles to operate in the video passthrough mode with the virtual artifice not visible and replaced by the at least one real world object with AR assist when the user's body position is in the first configuration, thereby providing correlations between the real world and the virtual world environments.

2. The method of claim 1 wherein the mixed realty simulation is a golf game.

3. The method of claim 2 wherein the at least one real world object is a golf club.

4. The method of claim 3 wherein the golf club includes an added clip-on device to garner motion metrics.

5. The method of claim 2 wherein a virtual golf ball is positioned in a real world space and appears as an AR overlay in the stereoscopic AR/VR goggles when operating in video passthrough mode.

6. The method of claim 5 wherein the virtual golf ball follows a trajectory through both the real world and VR environments after the real world object passes through the same real world space where the virtual golf ball is positioned.

7. The method of claim 2 wherein varying levels of difficulty are programmed into the AR/VR simulation to allow users of different abilities to compete against each other.

8. The method of claim 1 wherein the motion metric data of the at least one human user is generated by the stereoscopic AR/VR goggles.

9. The method of claim 8 wherein the motion metric data of the at least one human user generated by the stereoscopic AR/VR goggles include six degrees of freedom (6 DoF) tracking.

10. The method of claim 1 wherein the transition from AR to VR modes or VR to AR modes is a video dissolve.

11. The method of claim 10 wherein the video dissolve transition is completed in 1.5 seconds.

12. The method of claim 1 wherein the received real time metric data from the at least one human user includes:

(b)(iv) identification and/or authentication data of the human user.

13. The method of claim 1 wherein the received real time metric data from the at least one human user includes:

(b)(iv) biometric data of the human user.

14. The method of claim 1 wherein VR mode is displayed at 100% opacity.

* * * * *